United States Patent
Noh et al.

(10) Patent No.: US 11,031,590 B2
(45) Date of Patent: Jun. 8, 2021

(54) CATHODE ACTIVE MATERIAL FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: Mi Jung Noh, Daejeon (KR); Jik Soo Kim, Daejeon (KR); Sang Bok Kim, Daejeon (KR); Ji Hoon Choi, Daejeon (KR); Kook Hyun Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 45 days.

(21) Appl. No.: 16/399,407

(22) Filed: Apr. 30, 2019

(65) Prior Publication Data

US 2019/0393489 A1 Dec. 26, 2019

(30) Foreign Application Priority Data

Jun. 26, 2018 (KR) .................. 10-2018-0073435
Aug. 27, 2018 (KR) .................. 10-2018-0100631

(51) Int. Cl.
*H01M 4/485* (2010.01)
*H01M 4/36* (2006.01)
*C01G 53/00* (2006.01)
*H01M 4/525* (2010.01)
(Continued)

(52) U.S. Cl.
CPC ............ *H01M 4/366* (2013.01); *C01G 53/50* (2013.01); *H01M 4/485* (2013.01); *H01M 4/525* (2013.01); *H01M 10/0525* (2013.01); *C01P 2004/01* (2013.01); *C01P 2004/03* (2013.01); *C01P 2004/62* (2013.01); *C01P 2004/64* (2013.01); *C01P 2004/84* (2013.01); *C01P 2006/40* (2013.01); *H01M 2004/028* (2013.01)

(58) Field of Classification Search
CPC ........... H01M 10/0525; H01M 10/052; H01M 4/485; H01M 4/525; H01M 4/366
See application file for complete search history.

(56) References Cited

U.S. PATENT DOCUMENTS 6,458,487 B1    10/2002  Takeuchi et al.
2014/0057181 A1†  2/2014  Lee
2015/0010827 A1†  1/2015  Kim
(Continued)

FOREIGN PATENT DOCUMENTS

CN    102163718 A    8/2011
CN    104781960 A    7/2015
(Continued)

OTHER PUBLICATIONS

Lambert (Journal of Solid State Chemistry 89, 345-360 (1990)).*
(Continued)

*Primary Examiner* — Olatunji A Godo
(74) *Attorney, Agent, or Firm* — IP & T Group LLP

(57) ABSTRACT

A cathode active material for a lithium secondary battery includes a lithium-aluminum-titanium oxide formed on a surface of a lithium metal oxide particle having a specific formula. The cathode active material may have an improved structural stability even in a high temperature condition.

18 Claims, 15 Drawing Sheets

(51) Int. Cl.
  *H01M 10/0525*   (2010.01)
  *H01M 4/02*   (2006.01)

(56)           References Cited

U.S. PATENT DOCUMENTS

2015/0340686 A1† 11/2015 Sun
2016/0211517 A1* 7/2016 Beck .................... H01M 4/131
2016/0380263 A1† 12/2016 Nakayama
2017/0012284 A1* 1/2017 Bugga .................. H01M 4/366

FOREIGN PATENT DOCUMENTS

| CN | 105070896 | A | 11/2015 |
| CN | 105977476 | A | 9/2016 |
| CN | 108028369 | A | 5/2018 |
| CN | 108140821 | A | 6/2018 |
| JP | 2004-0103566 | | 4/2004 |
| JP | 2005-078800 | | 3/2005 |
| JP | 2007-103141 | | 4/2007 |
| JP | 2016-072071 | | 5/2016 |
| KR | 10-2015-0042730 | | 4/2015 |
| KR | 10-2015-0050458 | | 5/2015 |
| KR | 20150049288 | A † | 5/2015 |
| KR | 10-2015-0109668 | | 10/2015 |
| KR | 10-2017-0093085 | | 8/2017 |
| KR | 10-2018-0011207 | | 1/2018 |
| WO | 2015/111740 | | 7/2015 |

OTHER PUBLICATIONS

Nitta, N. et al., Li-ion battery materials: present and future, Jun. 2015, pp. 252-264, Materials Today, vol. 18, No. 5, Published by Elsevier Ltd.
Office Action issued by the Korean Intellectual Property Office dated Oct. 4, 2018.
Notice of Allowance issued by the Korean Intellectual Property Office dated Feb. 21, 2019.
Office Action issued by the CNIPA dated Apr. 8, 2021.

\* cited by examiner
† cited by third party

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2018-0073435 filed on Jun. 26, 2018 and Korean Patent Applications No. 10-2018-0100631 filed on Aug. 27, 2018 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. Particularly, to a lithium metal oxide-based cathode active material and a lithium secondary battery including the same.

2. Description of the Related Art

A secondary battery is a battery which can be repeatedly charged and discharged. With rapid progress of industries of information and communication, and display, the secondary battery has been widely applied to various portable telecommunication electronic devices such as a camcorder, a mobile phone, a laptop computer as a power source. Recently, a battery pack including the secondary battery has also been developed and applied to an eco-friendly automobile such as a hybrid vehicle as a power source.

Examples of the secondary battery may include a lithium secondary battery, a nickel-cadmium battery, and a nickel-hydrogen battery. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped sheath in which the electrode assembly and the electrolyte are housed.

In the lithium secondary battery, a lithium metal oxide is used as a cathode active material, and it is preferable to have a high capacity, a high output, and high life-span characteristics. Accordingly, there is a need to maintain a chemical stability even when the lithium metal oxide is repeatedly charged and discharged.

However, when the lithium metal oxide is exposed to the atmosphere or contacts with the electrolyte, by-products of lithium or nickel may be generated due to a side reaction on surfaces of lithium metal oxide particles. In this case, the life-span and operational stability of the lithium secondary battery may be deteriorated.

For example, Korean Patent Laid-Open Publication No. 10-2017-0093085 discloses a cathode active material including a transition metal compound and an ion adsorbing binder, but there is a limitation in securing sufficient operational stability of the cathode active material as described above.

SUMMARY

According to an aspect of the present invention, there is provided a cathode active material for a lithium secondary battery having improved electrical and mechanical reliability and stability.

According to an aspect of the present invention, there is provided a lithium secondary battery having improved electrical and mechanical reliability and stability.

According to exemplary embodiments, a cathode active material for a lithium secondary battery includes a lithium metal oxide particle formed of a crystal of a compound represented by Formula 1 below, and a lithium-aluminum-titanium oxide formed on at least a part of a surface of the lithium metal oxide particle:

$$Li_\alpha Ni_y M_z O_{2-\beta} \quad \text{[Formula 1]}$$

(wherein, in the above Formula 1, M is at least one element selected from the group consisting of Co, Mn, Ti, Zr, Al and B, and $\alpha$, $\beta$, $\gamma$, and z are in a range of $0.7 \leq \alpha \leq 1.1$, $-0.1 \leq \delta \leq 0.5$, $0.7 \leq y \leq 0.95$, and $0.95 < y+z \leq 1.1$, respectively).

In some embodiments, the lithium-aluminum-titanium oxide may be represented by Formula 2 below:

$$Li_\gamma Al_v Ti_w O_x \quad \text{[Formula 2]}$$

(wherein, in the above Formula 2, $\gamma$, v, w and x are in a range of $0.8 < \gamma \leq 1.2$, $0 < v \leq 1$, $0 < w \leq 1$, $0.98 \leq v+w \leq 1.02$, and $1.5 \leq x \leq 4$, respectively).

In some embodiments, in the above Formula 1, $M_z$ may be $Co_a Mn_b M'_c$, M' may be at least one element selected from the group consisting of Ti, Zr, Al and B, and a, b, c, and y may be in a range of $0.05 \leq a \leq 0.2$, $0.03 \leq b \leq 0.2$, and $0.95 < y+a+b+c \leq 1.1$, respectively.

In some embodiments, in the above Formula 1, a, b, c, and y may be in a range of $0.8 \leq y \leq 0.88$, $0.09 \leq a \leq 0.1$, $0.03 \leq b \leq 0.1$, respectively.

In some embodiments, the cathode active material for a lithium secondary battery may further include at least one of $Al_2O_3$ and $LiAlO_2$ formed on the surface of the lithium metal oxide particle.

In some embodiments, the cathode active material for a lithium secondary battery may further include $LiTiO_2$ formed on the surface of the lithium metal oxide particle.

In some embodiments, the cathode active material for a lithium secondary battery may further include a zirconium (Zr)-including oxide formed on the surface of the lithium metal oxide particle.

In some embodiments, the zirconium-including oxide may include AlZrO.

In some embodiments, the cathode active material for a lithium secondary battery may further include a boron (B)-including oxide formed on the surface of the lithium metal oxide particle.

In some embodiments, the boron-including oxide may include at least one selected from the group consisting of $B_4O_{10}$, $AlBO_3$ and $Li_2B_4O_7$.

In some embodiments, the lithium-aluminum-titanium oxide may be formed by dry-mixing the lithium metal oxide particle with $Al_2O_3$ and $TiO_2$ having a particle diameter of 30 to 70 nm, respectively, under a high temperature condition, then performing oxygenation.

In some embodiments, the dry-mixing may be performed by further including at least one of $ZrO_2$ and $H_3BO_3$.

In some embodiments, $Al_2O_3$, $TiO_2$, $ZrO_2$ and $H_3BO_3$ may be used in an amount of 2500 to 3500 ppm, 500 to 1500 ppm, 300 to 700 ppm, and 300 to 700 ppm, respectively, based on a weight of the lithium metal oxide particle.

In some embodiments, the $ZrO_2$ may have a particle diameter of 70 to 130 nm.

In some embodiments, the lithium-aluminum-titanium oxide may be formed by dry-mixing the lithium metal oxide particle with $Al_2O_3$, $TiO_2$ and $ZrO_2$ under a high temperature condition and performing oxygenation, then further dry-mixing $H_3BO_3$ therewith under a high temperature condition and performing oxygenation.

In some embodiments, $Al_2O_3$, $TiO_2$ and $ZrO2$ may be mixed at a temperature of 600 to 800° C. and the $H_3BO_3$ may be mixed at a temperature of 250 to 330° C.

In some embodiments, the lithium metal oxide particle and the lithium-aluminum-titanium oxide may be formed by dry-mixing a composite metal salt compound, a lithium salt compound, and $Al_2O_3$ and $TiO_2$ having a particle diameter of 30 to 70 nm, respectively, under a high temperature condition and performing oxygenation.

In some embodiments, at least a part of the surfaces of the lithium metal oxide particle may be coated with the lithium-aluminum-titanium oxide.

According to exemplary embodiments, a lithium secondary battery includes an electrode assembly including a cathode made of the cathode active material for a lithium secondary battery according to the above embodiments, an anode, and a separation membrane disposed between the cathode and the anode; a case in which the electrode assembly is housed; and an electrolyte in which the electrode assembly is impregnated in the case.

The cathode active material for a lithium secondary battery according to exemplary embodiments may include a lithium-aluminum-titanium oxide formed on surface of lithium metal oxide particle including a crystal having a specific formula. The cathode active material may have an improved stability in a high temperature through the lithium-aluminum-titanium oxide.

The lithium-aluminum-titanium oxide may further include an oxide including aluminum, titanium or boron. The stability of the cathode active material under a high temperature condition may be improved, so that the lithium secondary battery including the above oxide may have an improved life-span under a high temperature condition.

The lithium-aluminum-titanium oxide may be formed by mixing the lithium metal oxide particle with $Al_2O_3$, $TiO_2$, $ZrO_2$ and/or $H_3BO_3$ in dry condition at a high temperature. Thereby, a lithium-aluminum-titanium oxide firmly bonded to the lithium metal oxide particle may be formed, so that the lithium secondary battery may have more improved stability and life-span in a high temperature.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Figure 1:
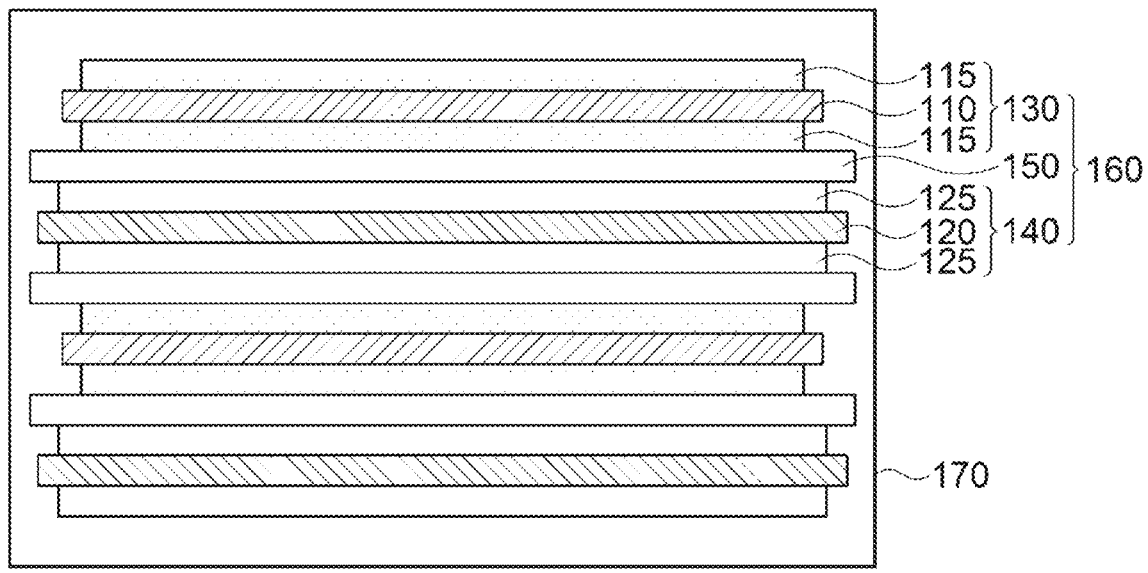
FIG. 1 is a schematic cross-sectional view illustrating a lithium secondary battery according to exemplary embodiments.

According to exemplary embodiments of the present invention, there is provided a cathode active material for a lithium secondary battery including a lithium-aluminum-titanium oxide formed on surface of a lithium metal oxide particle having a specific formula thereby improving a structural stability even in a high temperature condition, and a lithium secondary battery including the same.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

FIG. 1 is a schematic cross-sectional view illustrating a lithium secondary battery according to exemplary embodiments.

Referring to FIG. 1, the lithium secondary battery of the present invention may include a cathode 130, an anode 140, and a separation membrane 150 interposed between the cathode and the anode.

The cathode 130 may include a cathode current collector 110 and a cathode active material layer 115 formed by applying a cathode active material to the cathode current collector 110.

According to exemplary embodiments, the cathode active material may include lithium metal oxide particle formed of a crystal of a compound represented by Formula 1 below.

  [Formula 1]

In the above Formula 1, M is at least one element selected from the group consisting of Co, Mn, Ti, Zr, Al and B, and a, R, y, and z may be in a range of $0.7 \leq \alpha \leq 1.1$, $-0.1 \leq \beta \leq 0.5$, $0.7 \leq y \leq 0.95$, and $0.95 < y+z \leq 1.1$, respectively.

The term "excess" as used herein refers that be included as the largest content or molar ratio of metals except for lithium. The term "content" or "concentration" as used herein may mean a molar ratio in the lithium metal oxide.

For example, nickel may be provided as a metal associated with a capacity of the lithium secondary battery. The higher the content of nickel, the better the capacity and output of the lithium secondary battery. However, if the content of nickel is excessively increased, the life-span of the lithium secondary battery may be reduced, and it may be disadvantageous in aspects of mechanical and electrical stabilities. For example, when the content of nickel is excessively increased, faults such as an ignition, short-circuit, etc. may not be sufficiently suppressed upon occurring a penetration caused by an external object. Thus, according to exemplary embodiments, manganese (Mn) may be distributed along therewith as a whole to compensate for chemical and mechanical instabilities caused by nickel.

In addition, manganese (Mn) may be provided as metal associated with the mechanical and electrical stabilities of the lithium secondary battery. For example, manganese may suppress or reduce a fault such as an ignition, short-circuit, etc. which occurs when the cathode is penetrated by an external object. So that, the life-span of the lithium secondary battery may be increased. Further, cobalt (Co) may be metal associated with a conductivity or resistance of the lithium secondary battery.

If the lower limit of a nickel concentration is less than about 0.7, the capacity and output of the lithium secondary battery may be excessively reduced. If the upper limit of the nickel concentration exceeds about 0.95, it may cause a reduction in the life-span and an increase in the mechanical instability.

According to some embodiments, in the above Formula 1, $M_z$ may be $Co_aMn_bM'_c$, M' may be at least one element selected from the group consisting of Ti, Zr, Al and B, and a, b, c, and y may be in a range of $0.05 \leq a \leq 0.2$, $0.03 \leq b \leq 0.2$, and $0.95 < y+a+b+c \leq 1.1$, respectively. Therefore, the compound represented by Formula 1 is an NCM active material having nickel, cobalt and manganese as a major component, and may exhibit balanced characteristics in terms of the output, capacity, life-span and stability.

Preferably, in the above Formula 1, a, b, c, and y may be controlled so as to be in a range of $0.8 \leq y \leq 0.88$, $0.09 \leq a \leq 0.1$, $0.03 \leq b \leq 0.1$, respectively. Therefore, the compound represented by Formula 1 may be an NCM compound having a molar ratio of Ni of 80% or more, while exhibiting high-density energy characteristics.

In some embodiments, the lithium metal oxide particle may have a single-particle structure. The single-particle structure may include a single-crystalline structure.

In some embodiments, the lithium metal oxide particles may have a secondary particle structure formed by agglomeration of primary particles (e.g., crystals of the compound represented by Formula 1). The lithium metal oxide particles may have a mean particle diameter ($D_{50}$) of about 6 to about 25 m, and preferably about 10 to 16 μm.

For example, the lithium nickel oxide exposed to surfaces of the lithium metal oxide particles may react with air or moisture, then decomposed into lithium hydroxide, lithium carbonate, nickel oxide and the like, thus to generate by-products. Further, nickel ions exposed to the surfaces of the lithium metal oxide particles may react with the electrolyte to cause a phase transition in a surface layer of the particles, and a metamorphosis of the crystal structure.

In exemplary embodiments, the lithium metal oxide particle may include a lithium-aluminum-titanium oxide on at least a part of the surface thereof.

In exemplary embodiments, the lithium-aluminum-titanium oxide may form an oxide coating layer coating at least a part of the surface of the lithium metal oxide particle. The oxide coating layer may include a structure in which the lithium-aluminum-titanium oxide continuously cover at least a part of the surface of the lithium metal oxide, or a structure in which the lithium-aluminum-titanium oxides exist apart from each other such as a plurality of islands.

The lithium-aluminum-titanium oxide may include, for example, an oxide of Al, Ti, Zr or B and an oxide of an alloy thereof. These oxides may be used alone or in combination of two or more thereof.

The lithium metal oxide particles are passivated by the lithium-aluminum-titanium oxide, such that penetration stability and life-span may be further improved, and the structural stability of the particles may be ensured.

In some embodiments, the elements, the alloy or oxide of the lithium-aluminum-titanium oxide described above may be inserted into the lithium metal oxide particles as a dopant.

In the exemplary embodiments, the lithium-aluminum-titanium oxide may be formed as a separate layer from the surfaces of the lithium metal oxide particles as a boundary, and may be formed by penetrating the surfaces of the lithium metal oxide particles to a predetermined depth. For example, the oxide coating layer may have a thickness of 90 to 200 nm, and a penetration depth of 90 to 200 nm.

In general, Al, Ti and Zr are similar to transition metals of Ni, Co and Mn in terms of ionic radii, and have an oxidation number of +3 or +4, which is similar to that of the transition metals. Therefore, these metals may be easily doped into vacant sites of the transition metals in the structure.

Al is present as an oxide or a lithium complex oxide on the surfaces of the lithium metal oxide particles to prevent the surface structure of the cathode active material from being collapsed due to a side reaction between the electrolyte during an electrochemical reaction, while a part thereof may react with the electrolyte to form an another stable surface layer (e.g., $AlF_3$). Thus, Al may be effectively used as a material for the coating layer and the doped layer on the surface of the particles.

Ti and Zr are a material having an oxidation number of +4, and may balance the oxidation number so that the oxidation number of Ni can be maintained in +2 by replacing $Mn^{4+}$ in the lithium metal oxide having a high content of Ni. Therefore, an improvement in the battery capacity due to $Ni^{2+}$ may be increased. In addition, Ti may suppress a reduction in the output by $Ni^{2+}$ occupying the $Li^+$ site. In addition, since Zr has a strong binding force with oxygen, it is possible to prevent a structural change caused by oxygen desorption during the electrochemical reaction at room temperature and high temperature, and thereby improving the life-span stability of the cathode active material.

Further, the oxide including Ti has excellent electrical conductivity. Thus, when coating the surfaces of the lithium metal oxide particles with an oxide including Ti, an increase in resistance due to the coating may be minimized to suppress a reduction in the output characteristics.

In the present disclosure, the lithium-aluminum-titanium oxide may refer to an oxide including lithium, aluminum and titanium as a metal element, and an oxide in which a sum of the number of moles of aluminum and the number of moles of titanium is substantially the same as the number of moles of lithium. In addition, oxygen included in the oxide may have the number of moles that compensates for the oxidation number of the metal elements. According to some embodiments, the lithium-aluminum-titanium oxide may be a material consisting of lithium, aluminum, titanium, and oxygen.

The lithium-aluminum-titanium oxide including aluminum and titanium, may enhance the structural stability of the lithium metal oxide particles as well as improve the output and capacity characteristics. Therefore, the structural stability, and the output and capacity characteristics of the lithium metal oxide particles may be maintained even when storing or operating under a high temperature condition.

In some embodiments, the lithium-aluminum-titanium oxide may be represented by Formula 2 below.

$$Li_y Al_v Ti_w O_x \quad \text{[Formula 2]}$$

In the above Formula 2, γ, v, w and x may be in a range of 0.8≤γ≤1.2, 0<v≤1, 0<w≤1, 0.98≤v+w≤1.02, and 1.5≤x≤4, respectively. More preferably, v and w may be in a range of 0.1≤v≤0.9, and 0.1≤w≤0.9, respectively, and a sum of v and w may be 1 (i.e., v+w=1). When a content ratio of aluminum and titanium is within the above range, the structural stability of the cathode active material under the high temperature condition may be improved.

According to exemplary embodiments, in the above Formula 2, a ratio (v) of aluminum and a ratio (w) of titanium may be changed according to amounts of a raw material of aluminum (e.g., $Al_2O_3$) and a raw material of titanium (e.g., $TiO_2$), which are introduced during forming the coating layer.

In exemplary embodiments, the lithium metal oxide particle may further include at least one of an aluminum (Al)-including oxide and a titanium (Ti)-including oxide on the surface thereof. For example, the aluminum—including oxide may include at least one of $Al_2O_3$ and $LiAlO_2$, and the titanium-including oxide may include $LiTiO_2$. As at least one of the aluminum-including oxide and the titanium-including oxide is formed on the lithium metal oxide, the surface structural stability, and the output and capacity characteristics of the lithium metal oxide may be simultaneously improved.

In some embodiments, the lithium metal oxide particle may further include a zirconium (Zr)-including oxide on the surface thereof. For example, the zirconium-including oxide may include AlZrO. As the zirconium-including oxide is formed on the cathode active material, the structural stability of the cathode active material may be improved.

According to some embodiments, the lithium metal oxide particle may further include a boron (B)-including oxide on the surface thereof. For example, the boron-including oxide may include $B_4O_{10}$, $AlBO_3$ or $Li_2B_4O_7$. The boron-including oxide may be filled in concave and convex formed on the surfaces of the lithium metal oxide particles, and the surfaces of the lithium metal oxide particles may at least partially smoothen. Therefore, a surface area of the lithium metal oxide particles may be slightly reduced, and thereby reducing the side reaction between the lithium metal oxide and the electrolyte when operating the battery.

Hereinafter, a method of manufacturing a cathode active material according to the above-described embodiments of the present invention will be provided.

According to exemplary embodiments, metal salts of the active material may be prepared. The metal salts of the active material may include nickel salts, manganese salts and cobalt salts. Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, a hydrate thereof, etc.

The metal salts may be mixed with a precipitant and/or a chelating agent in a ratio satisfying the content of each metal or the concentration ratios described with reference to Formula 1 to prepare an aqueous solution. The aqueous solution may be co-precipitated in a reactor to prepare a composite metal salt compound (e.g., an NCM precursor).

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

Thereafter, the lithium salt compound may be mixed with the composite metal salt compound and reacted by co-precipitation to prepare lithium metal oxide particles. The lithium salt compound may include, for example, lithium carbonate, lithium nitrate, lithium acetate, lithium oxide, lithium hydroxide and the like. These compounds may be used alone or in combination of two or more thereof.

For example, $Al_2O_3$ and $TiO_2$ having a particle diameter of about 30 to 70 nm may be used for performing surface treatment with Al and Ti on lithium metal oxide particles. When the particle diameter of $Al_2O_3$ and $TiO_2$ is within the above range, the lithium-aluminum-titanium oxide may be formed more densely, thus to improve protective characteristics against an internal structure of the cathode active material. In the comparative examples, if the particle diameters of $Al_2O_3$ and $TiO_2$ are beyond the above range, a lithium-aluminum-titanium oxide may not be formed.

Using $Al_2O_3$ and $TiO_2$ having particle diameters similar to each other may be advantageous in terms of a uniformity of the surface treatment. By the surface treatment with Al and Ti, a lithium-aluminum-titanium oxide may be formed on the surfaces of the lithium metal oxide particles uniformly.

In addition, in some embodiments, $ZrO_2$ having a particle diameter of about 70 to 130 nm may be used together with Al and Ti in the surface treatment. Therefore, the lithium-aluminum-titanium oxide and at least one of Zr and the Zr-including oxide (e.g., AlZrO) are formed together, so that the strength of the oxide coating layer may be improved.

The $Al_2O_3$, $TiO_2$, and $ZrO_2$ may be coated on the surface of the active material through a high-speed rotating equipment, and then subjected to a high temperature heat treatment to form an oxide coating layer or to be doped.

In some embodiments, the heat treatment may be performed at a temperature of about 600 to 800° C.

According to some embodiments, LiOH and $Li_2CO_3$ remaining in the oxide coating layer formed on the lithium metal oxide or its surface may be removed by washing with an aqueous or organic solvent. In this case, an area, in which a side reaction may occur when operating the battery, may be increased, and additional coating may be performed using boron so as to suppress the side reaction.

For example, $H_3BO_3$ may be dry-mixed with lithium metal oxide particles under a high temperature and subjected to oxygenation to form a boron-including oxide on the surface of the lithium metal oxide particle. For example, dry-mixing may be performed at a high temperature of 250 to 330° C. The boron-including oxide may at least partially cover the lithium metal oxide particles, and the boron-including oxide may be integrated with the lithium-aluminum-titanium oxide to form the oxide coating layer. For example, the boron-including oxide may be present in a doped form within the lithium-aluminum-titanium oxide coating layer.

In some embodiments, the lithium-aluminum-titanium oxide may be formed using only $Al_2O_3$ and $TiO_2$, and preferably $ZrO_2$ or $H_3BO_3$ may be used together therewith to form oxides on the surfaces of the lithium metal oxide particles.

In some embodiments, $Al_2O_3$, $TiO_2$, $ZrO_2$ and $H_3BO_3$ may form an oxides through one hot dry-mixing process. In some embodiments, after forming a first oxide by $Al_2O_3$, $TiO_2$ and $ZrO_2$ through a first hot dry-mixing process, $H_3BO_3$ forms a second oxide through a second hot dry-mixing process. The first oxide and the second oxide may be provided as separate layers (first oxide coating layer and second oxide coating layer), and the second oxide coating layer may be penetrated into the first oxide coating layer to be integrated therewith, such that it may be provided as one layer.

According to exemplary embodiments, the $Al_2O_3$, $TiO_2$, $ZrO_2$ and $H_3BO_3$ may be used in an amount of 2500 to 3500 ppm, 500 to 1500 ppm, 300 to 700 ppm, and 300 to 700 ppm, respectively, based on a weight of the lithium metal oxide particles. If the used amount thereof is less than the above range, the oxides is not suitably formed. When the used amount thereof exceeds the above range, the oxide may be too thickly formed, thereby reducing electrical characteristics of the cathode active material.

When forming the oxide using all of $Al_2O_3$, $TiO_2$, $ZrO_2$ and $H_3BO_3$, the lithium-aluminum-titanium oxide may be more effectively formed, and thereby improving the structural stability (in particular, at a high temperature) and life-span of the cathode active material.

According to some embodiments, the lithium metal oxide particles and the oxides may be prepared by dry-mixing the composite metal salt compound, lithium salt compound, $Al_2O_3$ and $TiO_2$ under a high temperature condition, and performing oxygenation. In addition, $ZrO_2$ or $H_3BO_3$ may be simultaneously mixed together with $Al_2O_3$ and $TiO_2$.

By dry-mixing the composite metal salt compound, lithium salt compound, $Al_2O_3$ and $TiO_2$ under a high temperature condition, and performing oxygenation, a two-step process for preparing the lithium metal oxide particles and then forming the oxides may be integrated into one-step process, such that economic advantages and efficiency may be improved.

A slurry may be prepared by mixing the cathode active material with a binder, a conductive material and/or a dispersant in a solvent, and stirring the same. The slurry may be coated on the cathode current collector 110, followed by compressing and drying to manufacture the cathode 130.

The cathode current collector 110 may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

According to exemplary embodiments, the anode 140 may include an anode current collector 120 and an anode active material layer 125 formed by coating the anode current collector 120 with an anode active material.

The anode active material useable in the present invention may include any material known in the related art, so long as it can absorb and desorb lithium ions, without particular limitation thereof. For example, carbon-based materials such as crystalline carbon, amorphous carbon, carbon composite, carbon fiber, etc.; a lithium alloy; silicon or tin may be used. Examples of the amorphous carbon may include hard carbon, cokes, mesocarbon microbead (MCMB) calcined at a temperature of 1500° C. or less, mesophase pitch-based carbon fiber (MPCF), or the like. The crystalline carbon may include graphite-based carbon such as natural graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The anode current collector 120 may include, for example, gold, stainless steel, nickel, aluminum, titanium, copper, or an alloy thereof, and preferably includes copper or a copper alloy.

In some embodiments, a slurry may be prepared by mixing the anode active material with a binder, a conductive material and/or a dispersant in a solvent, and stirring the same. The slurry may be coated on the anode current collector 120, followed by compressing and drying to manufacture the anode 140.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

A separation membrane 150 may be interposed between the cathode 130 and the anode 140. The separation membrane 150 may include a porous polymer film made of a polyolefin polymer such as ethylene homopolymer, propylene homopolymer, ethylene/butene copolymer, ethylene/hexene copolymer, ethylene/methacrylate copolymer. The separation membrane may include a nonwoven fabric made of glass fiber having a high melting point, polyethylene terephthalate fiber or the like.

In some embodiments, the anode 140 may have an area and/or volume (e.g., a contact area with the separation membrane 150) larger than those/that of the cathode 130. Thereby, lithium ions generated from the cathode 130 may smoothly move to the anode 140 without being precipitated in the middle, for example. Therefore, effects of simultaneously improving the output and stability by using the above-described cathode active material may be more easily realized.

According to exemplary embodiments, the electrode cell 160 is defined by the cathode 130, the anode 140, and the separation membrane 150, and a plurality of electrode cells 160 are stacked to form, for example, a jelly roll type electrode assembly. For example, the electrode assembly may be formed by winding, laminating, folding, or the like of the separation membrane.

The electrode assembly is housed in an outer case 170 together with the electrolyte, such that a lithium secondary battery may be defined. According to exemplary embodiments, a non-aqueous electrolyte may be used as the electrolyte.

The non-aqueous electrolyte includes a lithium salt as an electrolyte and an organic solvent. The lithium salt is represented by, for example, LiX and may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like as an example.

Examples of the organic solvent may use any one of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof. These compounds may be used alone or in combination of two or more thereof.

Electrode tabs may be respectively formed from the cathode current collector 110 and the anode current collector 120 belonging to each electrode cell and may extend to one side of the outer case 170. The electrode tabs may be fused together with the one side of the outer case 170 to form an electrode lead extending or exposed to an outside of the outer case 170.

The lithium secondary battery may be manufactured, for example, in a cylindrical shape using a can, a square shape, a pouch shape or a coin shape.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Examples 1 to 22 and Comparative Examples 1 to 35

(1) Preparation of Cathode Active Material

1. Preparation of Lithium Metal Oxide Particles $NiSO_4$, $CoSO_4$, and $MnSO_4$ were mixed in ratios (molar ratios) shown in Table 1 below using distilled water in which internal dissolved oxygen was removed by bubbling with $N_2$ for 24 hours. The solution was introduced into a reactor at 50° C., and a co-precipitation reaction was performed for 48 hours using NaOH and $NH_3H_2O$ as a precipitant and a chelating agent to form a nickel-cobalt-manganese hydroxide (composite metal salt compound) having a particle diameter of about 10 to 20 μm. The composite metal salt compound was dried at 80° C. for 12 hours, and then again dried at 110° C. for 12 hours.

Thereafter, lithium hydroxide was further added thereto so that a ratio of the mixed metal salt compound to the lithium hydroxide was 1:1.05, followed by uniformly stirring and mixing the same for 5 minutes. The mixture was put in a calcination furnace, heated to 710° C. at a heating rate of 2° C./min, and maintained at 710° C. for 10 hours. Oxygen was passed continuously at a flow rate of 10 mL/min during heating and maintenance. After completion of the calcination, the mixture was naturally cooled to room temperature, followed by grinding and classification to obtain lithium metal oxide particles. The molar ratio of nickel, cobalt and manganese of the lithium metal oxide particles was as shown in Table 1 below (e.g., the lithium metal oxide particle of Example 7 has a formula of $LiNi_{0.8}Co_{0.1}Mn_{0.1}O_2$).

2. Treatment of $Al_2O_3$, $TiO_2$ and/or $ZrO_2$ $Al_2O_3$ and $TiO_2$ having a particle diameter of about 30 to 70 nm and/or $ZrO_2$ having a particle diameter of about 100 nm were added to a dry high-speed mixer as shown in Table 1 below based on the weight of the lithium metal oxide particles and mixed uniformly for 5 minutes. The mixture was put in a calcination furnace, heated to 700° C. at a heating rate of 2° C./min, and maintained at 700° C. for 10 hours. Oxygen was passed continuously at a flow rate of 10 mL/min during heating and maintenance. After completion of the calcination, the mixture was naturally cooled to room temperature, followed by grinding and classification to obtain a cathode active material with a formula of $LiNi_{0.8}Co_{0.1}Mn_{0.1}O_2$ subjected to surface treatment with Al/Ti (lithium-aluminum-titanium oxide is formed).

3. Treatment of $H_3BO_3$

The cathode active material was added to an aqueous solvent, stirred for 30 minutes, then filtered to remove the solvent, followed by drying in a vacuum oven at 150° C. for 24 hours. The dried active material and $H_3BO_3$ were added to a dry high-speed mixer in amounts shown in Table 1 below, and homogeneously mixed for 5 minutes. The mixture was put in a calcination furnace, heated to 300° C. at a heating rate of 2° C./min, and maintained at 300° C. for 5 hours. Oxygen was passed continuously at a flow rate of 10 mL/min during heating and maintenance. After completion of the calcination, the mixture was naturally cooled to room temperature, followed by grinding and classification to prepare a cathode active material.

Example 23

$NiSO_4$, $CoSO_4$, and $MnSO_4$ were mixed in a ratio of 0.8:0.1:0.1 (molar ratio) shown in Table 1 below using distilled water with internal dissolved oxygen removed by bubbling with $N_2$ for 24 hours. The solution was introduced into a reactor at 50° C., and a co-precipitation reaction was performed for 48 hours using NaOH and $NH_3H_2O$ as a precipitant and a chelating agent to form an $Ni_{0.8}Co_{0.1}Mn_{0.1}(OH)_2$ (NCM) composite metal salt having a particle diameter of 14 μm. The composite metal salt was dried at 80° C. for 12 hours, and then again dried at 110° C. for 12 hours.

Thereafter, lithium hydroxide was further added thereto so that a ratio of the composite metal salt to the lithium hydroxide was 1:1.05. Then, about 3000 ppm of $Al_2O_3$ and $TiO_2$ each having a particle diameter of about 30 to 70 nm and about 500 ppm of $ZrO_2$ having a particle diameter of about 100 nm based on the weight of the composite metal salt were added to a dry high-speed mixer and mixed homogeneously for 5 minutes. The mixture was put in a calcination furnace, heated to 500° C. at a heating rate of 2° C./min, and maintained for 5 hours, then again heated to 710° C. at the same heating rate, followed by maintaining at 710° C. for 10 hours. Oxygen was passed continuously at a flow rate of 10 mL/min during heating and maintenance. After completion of the calcination, the mixture was naturally cooled to room temperature, followed by grinding and classification to obtain a cathode active material with a formula of $LiNi_{0.8}Co_{0.1}Mn_{0.1}O_2$ subjected to surface treatment with Al/Ti (lithium-aluminum-titanium oxide is formed).

The cathode active material was added to an aqueous solvent, stirred for 30 minutes, then filtered to remove the solvent, followed by drying in a vacuum oven at 150° C. for 24 hours. The dried active material was added to a dry high-speed mixer after putting 500 ppm of $H_3BO_3$ and mixed homogeneously for 5 minutes. The mixture was put in a calcination furnace, heated to 300° C. at a heating rate of 2° C./min, and maintained at 300° C. for 5 hours. Oxygen was passed continuously at a flow rate of 10 mL/min during heating and maintenance. After completion of the calcination, the mixture was naturally cooled to room temperature, followed by grinding and classification to obtain a cathode active material with a formula of $LiNi_{0.8}Co_{0.1}Mn_{0.1}O_2$ of Example 23.

Comparative Example 36

A cathode active material was prepared by the same manner as in Example 7 except that particles having a particle diameter $D_{50}=10$ μm were used as $TiO_2$.

TABLE 1

| | Transition metal ratio in cathode active material (mol %) | | | Input (ppm) | | | |
|---|---|---|---|---|---|---|---|
| | Ni | Co | Mn | $Al_2O_3$ | $TiO_2$ | $ZrO_2$ | $H_3BO_3$ |
| Example 1 | 70 | 15 | 15 | 3000 | 1000 | 500 | — |
| Example 2 | 70 | 15 | 15 | 3000 | 1000 | — | 500 |
| Example 3 | 70 | 15 | 15 | 3000 | 1000 | 500 | 500 |
| Example 4 | 80 | 10 | 10 | 3000 | 1000 | — | — |
| Example 5 | 80 | 10 | 10 | 3000 | 1000 | 500 | — |
| Example 6 | 80 | 10 | 10 | 3000 | 1000 | — | 500 |
| Example 7 | 80 | 10 | 10 | 3000 | 1000 | 500 | 500 |
| Example 8 | 80 | 10 | 10 | 3000 | 1000 | 500 | 800 |
| Example 9 | 80 | 10 | 10 | 3000 | 1000 | 1500 | 500 |
| Example 10 | 80 | 10 | 10 | 3000 | 3600 | 500 | 500 |
| Example 11 | 80 | 10 | 10 | 6000 | 1000 | 500 | 500 |
| Example 12 | 83 | 9 | 8 | 3000 | 1000 | — | — |
| Example 13 | 83 | 9 | 8 | 3000 | 1000 | 500 | — |
| Example 14 | 83 | 9 | 8 | 3000 | 1000 | — | 500 |
| Example 15 | 83 | 9 | 8 | 3000 | 1000 | 500 | 500 |
| Example 16 | 88 | 9 | 3 | 3000 | 1000 | — | — |
| Example 17 | 88 | 9 | 3 | 3000 | 1000 | 500 | — |
| Example 18 | 88 | 9 | 3 | 3000 | 1000 | — | 500 |
| Example 19 | 88 | 9 | 3 | 3000 | 1000 | 500 | 500 |
| Example 20 | 92 | 5 | 3 | 3000 | 1000 | — | — |
| Example 21 | 92 | 5 | 3 | 3000 | 1000 | — | 500 |
| Example 22 | 92 | 5 | 3 | 3000 | 1000 | 500 | 500 |
| Example 23 | 80 | 10 | 10 | 3000 | 3000 | 500 | 500 |
| Comparative Example 1 | 80 | 10 | 10 | — | — | — | — |
| Comparative Example 2 | 80 | 10 | 10 | 3000 | — | — | — |
| Comparative Example 3 | 80 | 10 | 10 | — | 1000 | — | — |
| Comparative Example 4 | 80 | 10 | 10 | — | — | 500 | — |
| Comparative Example 5 | 80 | 10 | 10 | — | — | — | 500 |
| Comparative Example 6 | 80 | 10 | 10 | 3000 | — | 500 | — |
| Comparative Example 7 | 80 | 10 | 10 | 3000 | — | — | 500 |
| Comparative Example 8 | 80 | 10 | 10 | — | 1000 | 500 | — |
| Comparative Example 9 | 80 | 10 | 10 | — | 1000 | — | 500 |
| Comparative Example 10 | 80 | 10 | 10 | — | 1000 | 500 | 500 |
| Comparative Example 11 | 80 | 10 | 10 | — | — | 500 | 500 |
| Comparative Example 12 | 83 | 9 | 8 | — | — | — | — |
| Comparative Example 13 | 83 | 9 | 8 | 3000 | — | 500 | — |
| Comparative Example 14 | 83 | 9 | 8 | 3000 | — | — | 500 |
| Comparative Example 15 | 83 | 9 | 8 | — | 1000 | 500 | — |
| Comparative Example 16 | 83 | 9 | 8 | — | 1000 | — | 500 |
| Comparative Example 17 | 83 | 9 | 8 | — | 1000 | 500 | 500 |
| Comparative Example 18 | 88 | 9 | 3 | — | — | — | — |
| Comparative Example 19 | 88 | 9 | 3 | — | — | 500 | 500 |
| Comparative Example 20 | 88 | 9 | 3 | 3000 | — | 500 | — |
| Comparative Example 21 | 88 | 9 | 3 | 3000 | — | — | 500 |
| Comparative Example 22 | 88 | 9 | 3 | — | 1000 | 500 | — |
| Comparative Example 23 | 88 | 9 | 3 | — | 1000 | — | 500 |
| Comparative Example 24 | 88 | 9 | 3 | — | 1000 | 500 | 500 |
| Comparative Example 25 | 88 | 9 | 3 | — | — | 500 | 500 |
| Comparative Example 26 | 92 | 5 | 3 | — | — | — | — |
| Comparative Example 27 | 92 | 5 | 3 | — | 1000 | 500 | 500 |
| Comparative Example 28 | 70 | 15 | 15 | — | — | — | — |
| Comparative Example 29 | 70 | 15 | 15 | — | 1000 | 500 | 500 |
| Comparative Example 30 | 60 | 20 | 20 | — | — | — | — |
| Comparative Example 31 | 60 | 20 | 20 | 3000 | 1000 | 500 | — |
| Comparative Example 32 | 60 | 20 | 20 | 3000 | 1000 | 500 | 500 |
| Comparative Example 33 | 50 | 20 | 30 | — | — | — | — |
| Comparative Example 34 | 50 | 20 | 30 | 3000 | 1000 | 500 | — |
| Comparative Example 35 | 50 | 20 | 30 | 3000 | 1000 | 500 | 500 |

TABLE 1-continued

| | Transition metal ratio in cathode active material (mol %) | | | Input (ppm) | | | |
|---|---|---|---|---|---|---|---|
| | Ni | Co | Mn | Al$_2$O$_3$ | TiO$_2$ | ZrO$_2$ | H$_3$BO$_3$ |
| Comparative Example 36 | 80 | 10 | 10 | 3000 | 1000 (D$_{50}$ = 10 μm) | 500 | 500 |

(2) Manufacturing of Secondary Battery

Secondary batteries were manufactured using the cathode active materials prepared in the examples and comparative examples described in the above Table 1. Specifically, the cathode active materials, Denka Black as a conductive material and PVDF as a binder were mixed in a mass ratio composition of 94:3:3, respectively, to prepare a cathode slurry. Then, the slurry was applied to an aluminum current collector, and a cathode was prepared through drying and pressing. After the pressing, the cathode was controlled so as to have an electrode density of 3.5 g/cc or more.

An anode slurry, which includes 93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener, was prepared. The anode slurry was applied to a copper substrate, followed by drying and pressing to prepare an anode.

The cathodes and the anodes prepared as described above were respectively notched in a predetermined size and stacked, then an electrode cell was fabricated between the cathode and the anode with a separator (polyethylene, thickness: 25 μm) interposed therebetween. Thereafter, tap parts of the cathode and the anode were welded, respectively. A combination of the welded cathode/separator/anode was put into a pouch, followed by sealing three sides of the pouch except for one side into which an electrolyte is injected. At this time, a portion having the electrode tab was included in the sealing part. After injecting the electrolytic through the remaining one side except for the sealing part, and the remaining one side was also sealed, followed by impregnation for 12 hours or more.

The electrolyte used herein was prepared by dissolving 1M LiPF$_6$ solution in a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

Experimental Example (1) Analysis of Surface and Internal Structure

TOF-SIMS Analysis

TOF-SIMS5 from ION TOF Co. was used to perform a TOF-SIMS analysis. The electrode was attached to a substrate for measurement, followed by degassing for about 30 minutes or more, then a vacuum state was formed to a pressure of 10$^{-9}$ mBar or less to remove impurities other than the material to be analyzed. Thereafter, a secondary ion mass spectrum was obtained for about 800 seconds.

Figure 2A:
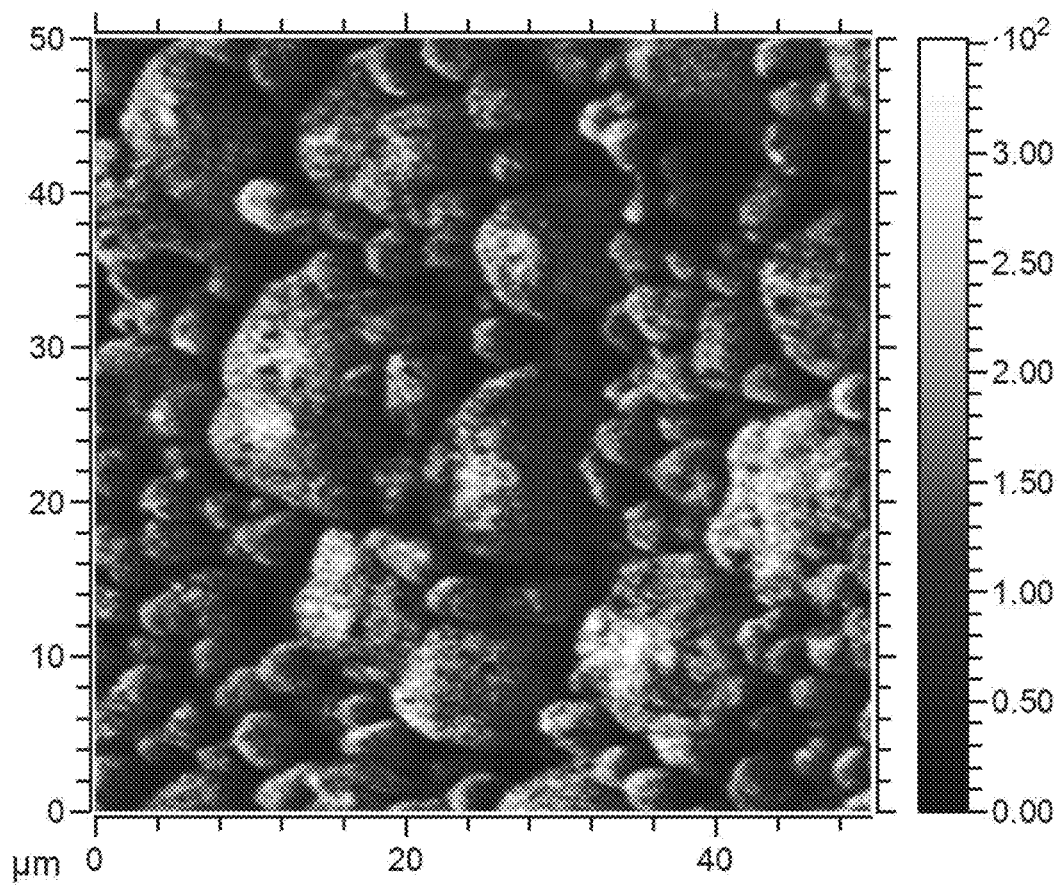
FIG. 2A is a time-of-flight secondary ion mass spectrometry (TOF-SIMS) image illustrating a surface of a cathode prepared using a cathode active material for a lithium secondary battery of Example 7.

FIG. 2A is a time-of-flight secondary ion mass spectrometry (TOF-SIMS) image illustrating a surface of a cathode prepared using a cathode active material for a lithium secondary battery of Example 7.

Figure 2B:
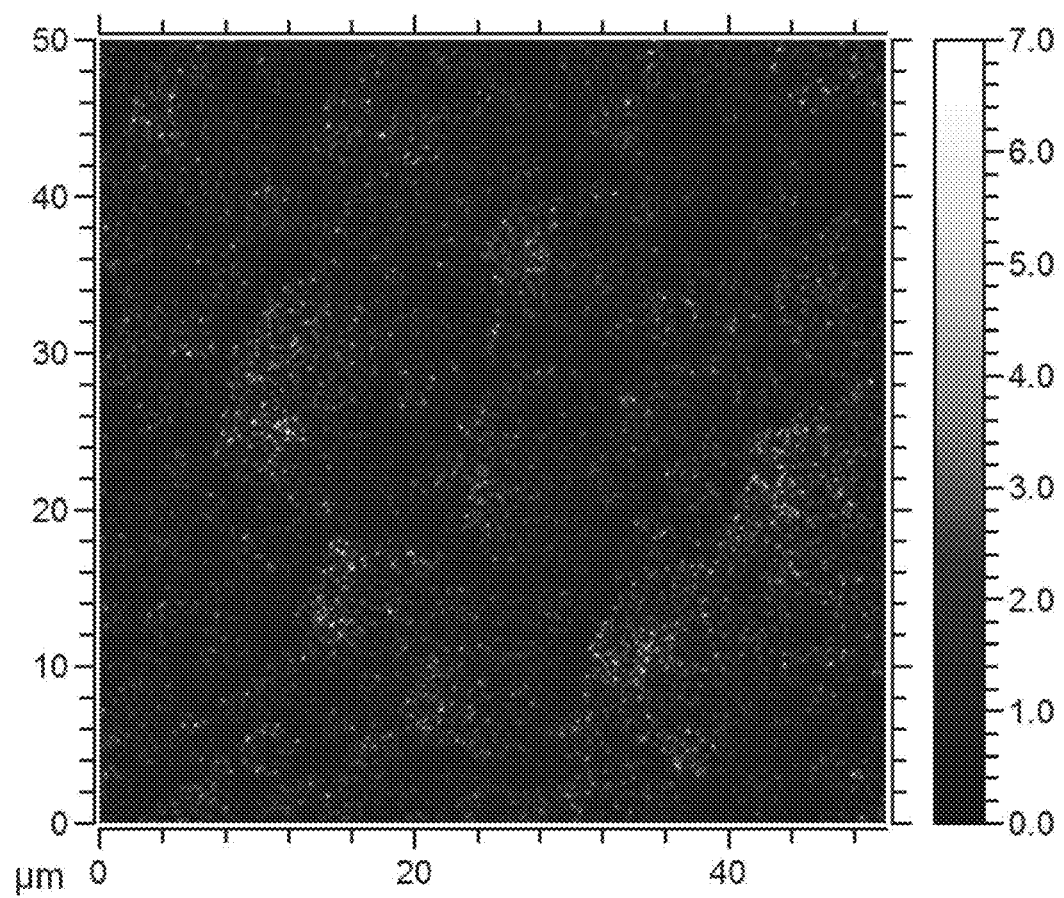
FIG. 2B is an image illustrating a distribution of $LiTiAl^+$ compounds in the image of FIG. 2A.

FIG. 2B is an image illustrating a distribution of LiTiAl$^+$ compounds in the image of FIG. 2A.

Figure 2C:
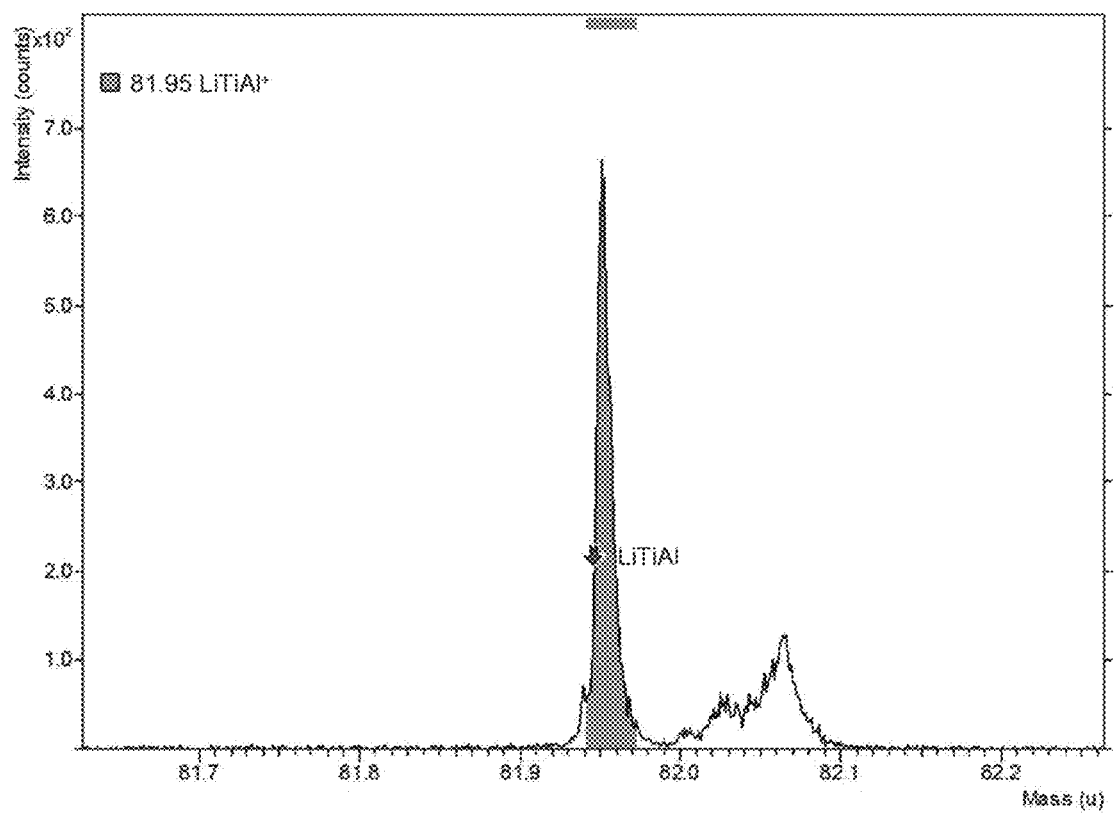
FIG. 2C is a graph illustrating analyzed results of contents of $LiTiAl^+$ compound in the region corresponding to the image of FIG. 2B.

FIG. 2C is a graph illustrating analyzed results of contents of LiTiAl$^+$ compound in the region corresponding to the image of FIG. 2B.

Figure 3A:
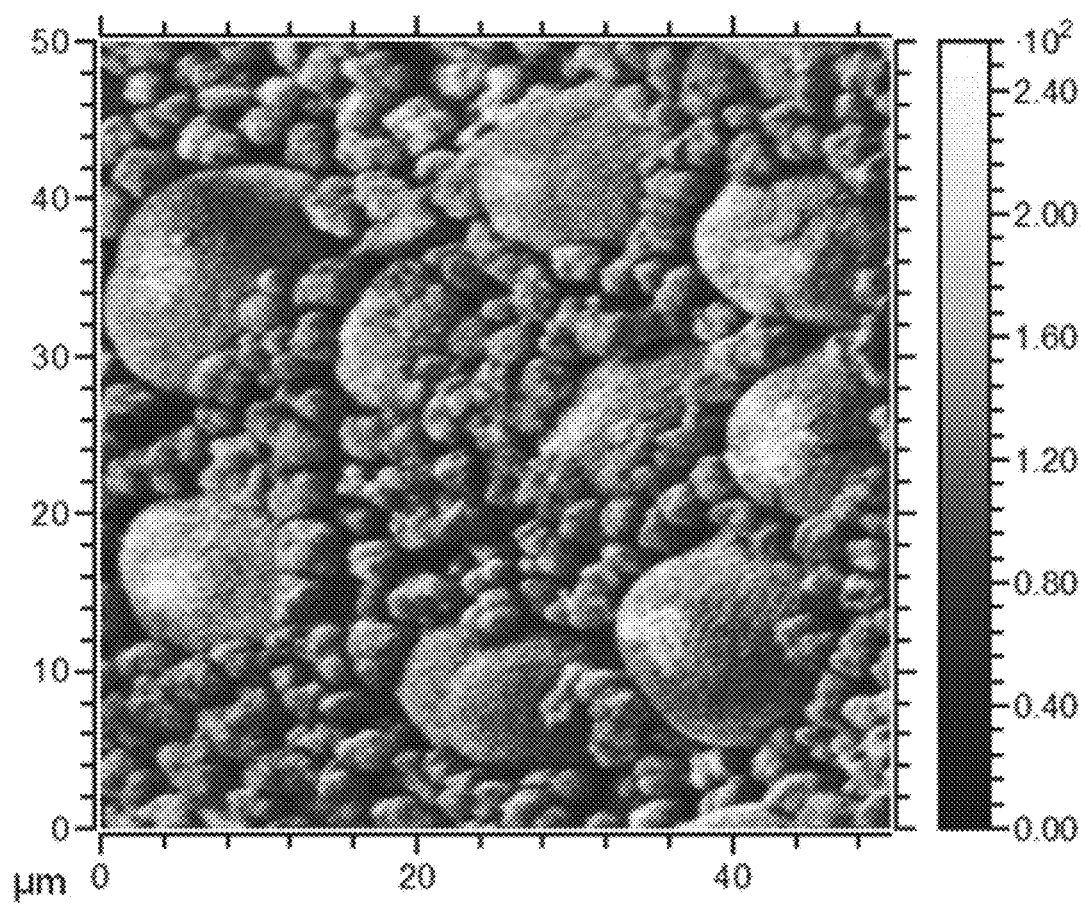
FIG. 3A is a TOF-SIMS image illustrating a surface of a cathode prepared using a cathode active material for a lithium secondary battery of Example 23.

FIG. 3A is a TOF-SIMS image illustrating a surface of a cathode prepared using a cathode active material for a lithium secondary battery of Example 23.

Figure 3B:
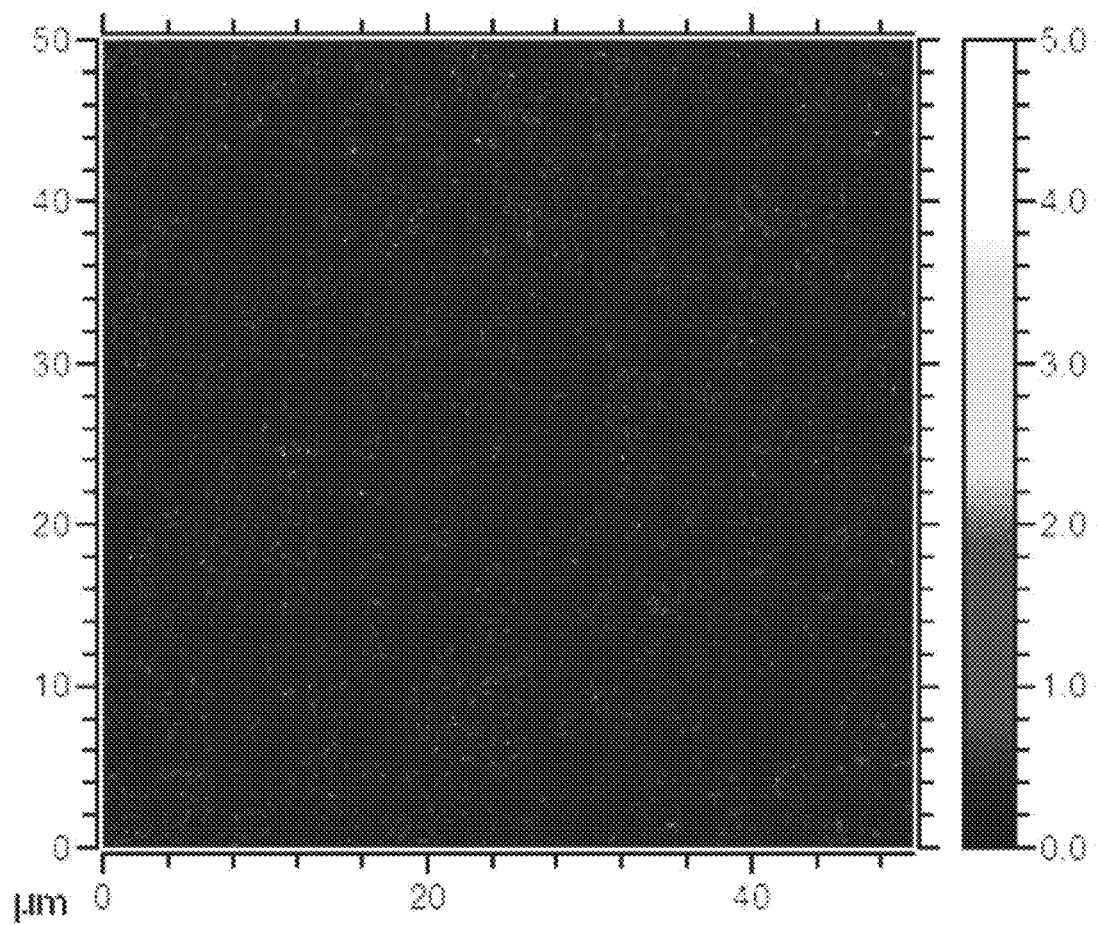
FIG. 3B is an image illustrating the distribution of $LiTiAl^+$ compounds in the image of FIG. 3A.

FIG. 3B is an image illustrating the distribution of LiTiAl$^+$ compounds in the image of FIG. 3A.

Figure 4:
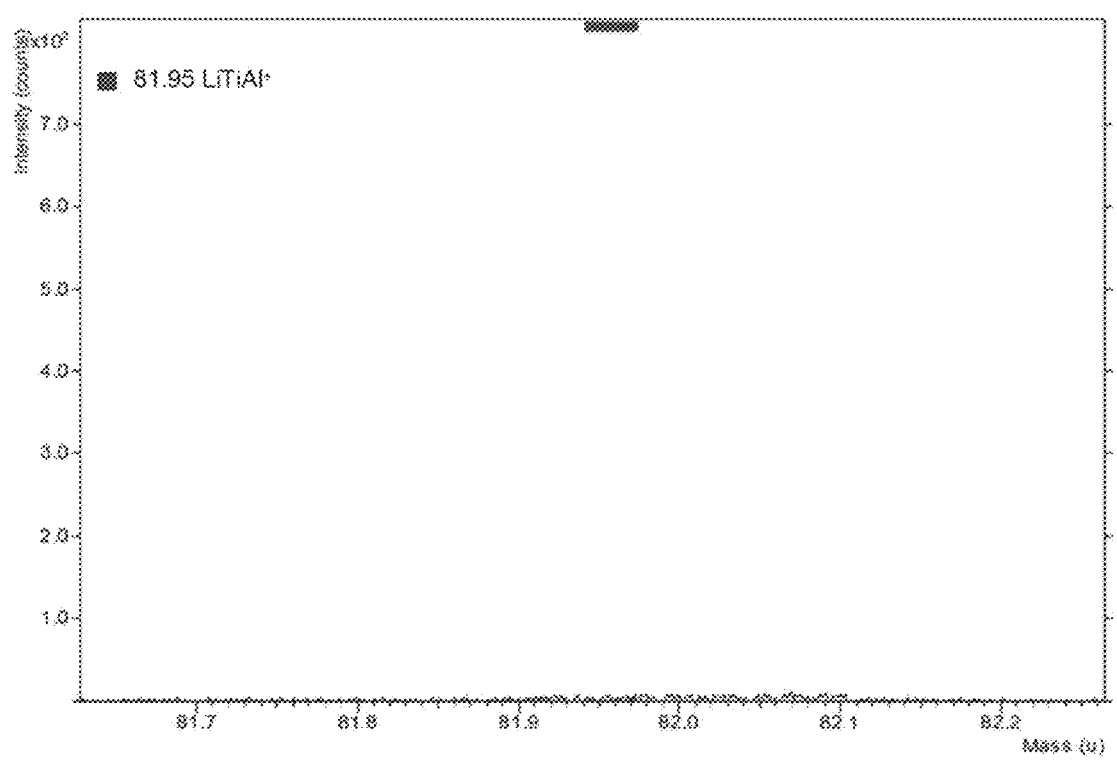
FIG. 4 is a graph illustrating analyzed results of contents of $LiTiAl^+$ compound present on a surface of a cathode prepared using a cathode active material of Comparative Example 1.

FIG. 4 is a graph illustrating analyzed results of contents of LiTiAl$^+$ compound present on a surface of a cathode prepared using a cathode active material of Comparative Example 1.

Figure 5A:
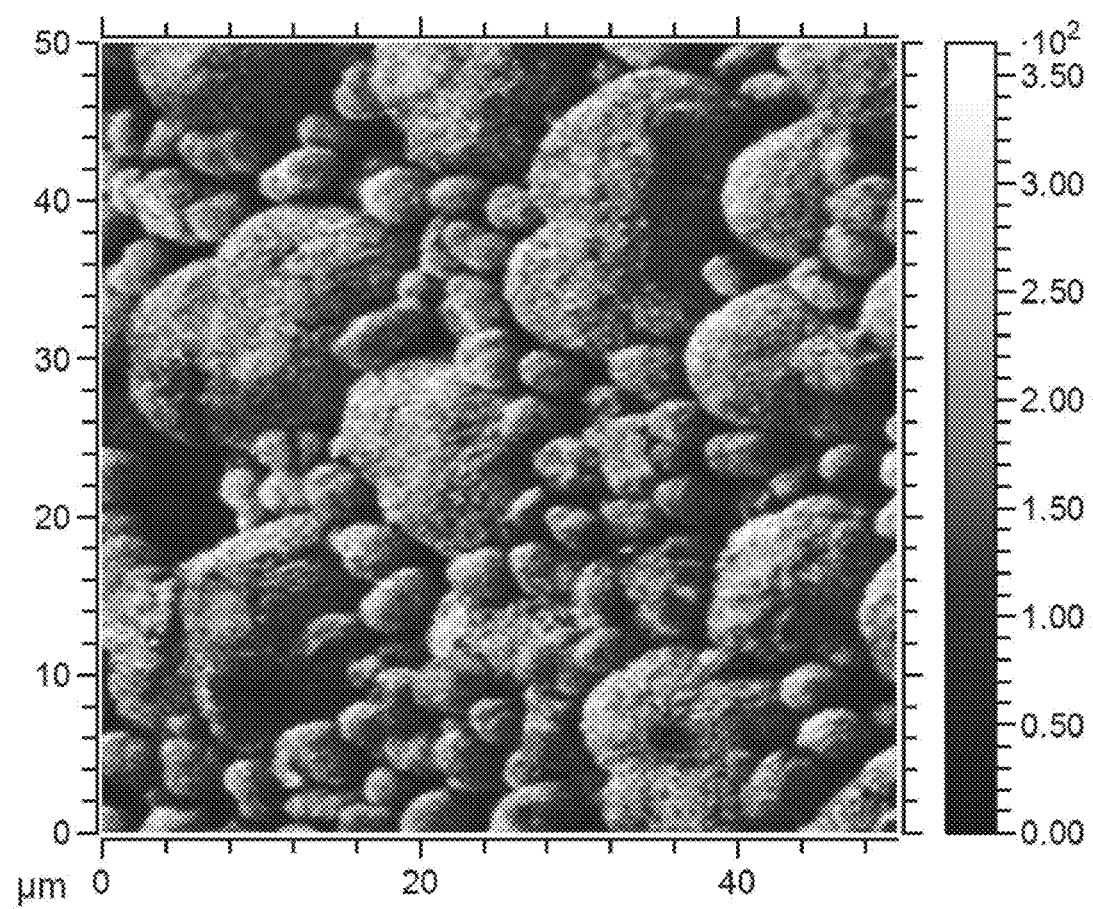
FIG. 5A is a TOF-SIMS image of a surface of a cathode prepared using a cathode active material for a lithium secondary battery of Comparative Example 36.

FIG. 5A is a TOF-SIMS image of a surface of a cathode prepared using a cathode active material for a lithium secondary battery of Comparative Example 36.

Figure 5B:
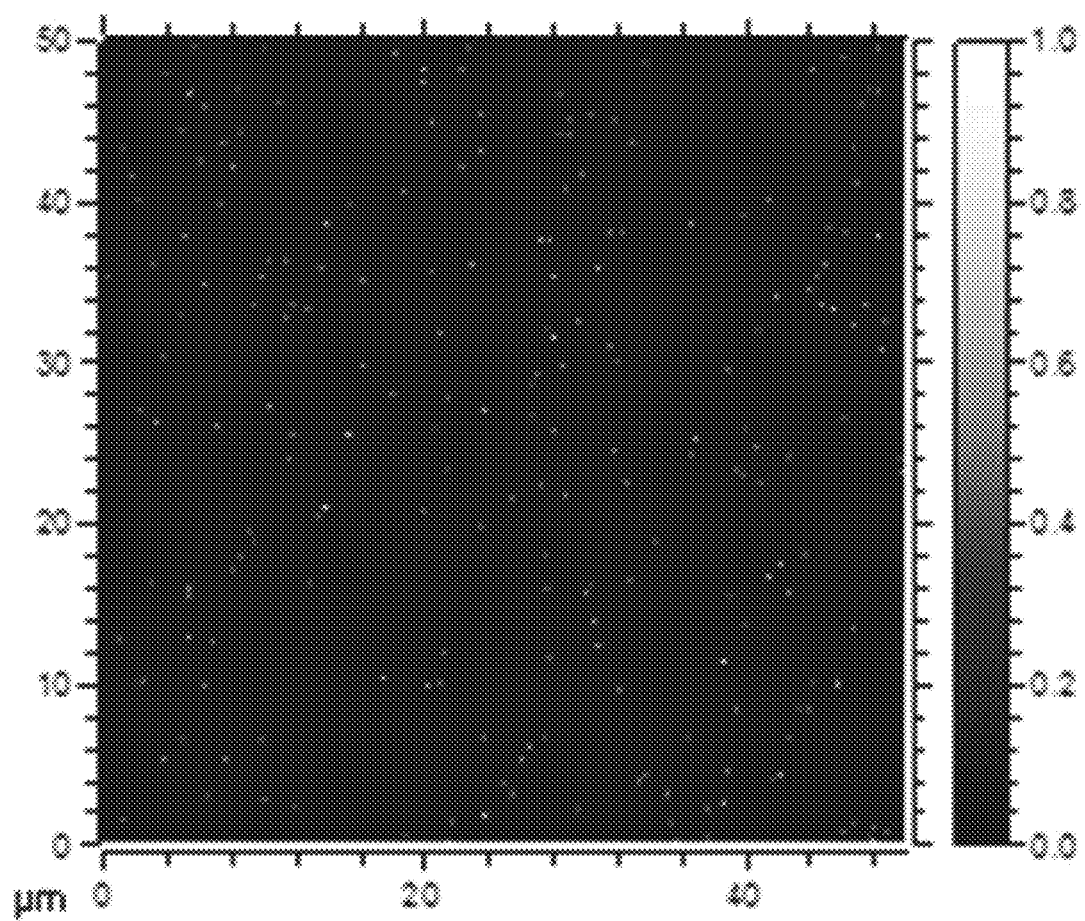
FIG. 5B is an image illustrating the distribution of $LiTiAl^+$ compounds in the image of FIG. 5A.

FIG. 5B is an image illustrating the distribution of LiTiAl$^+$ compounds in the image of FIG. 5A.

Figure 5C:
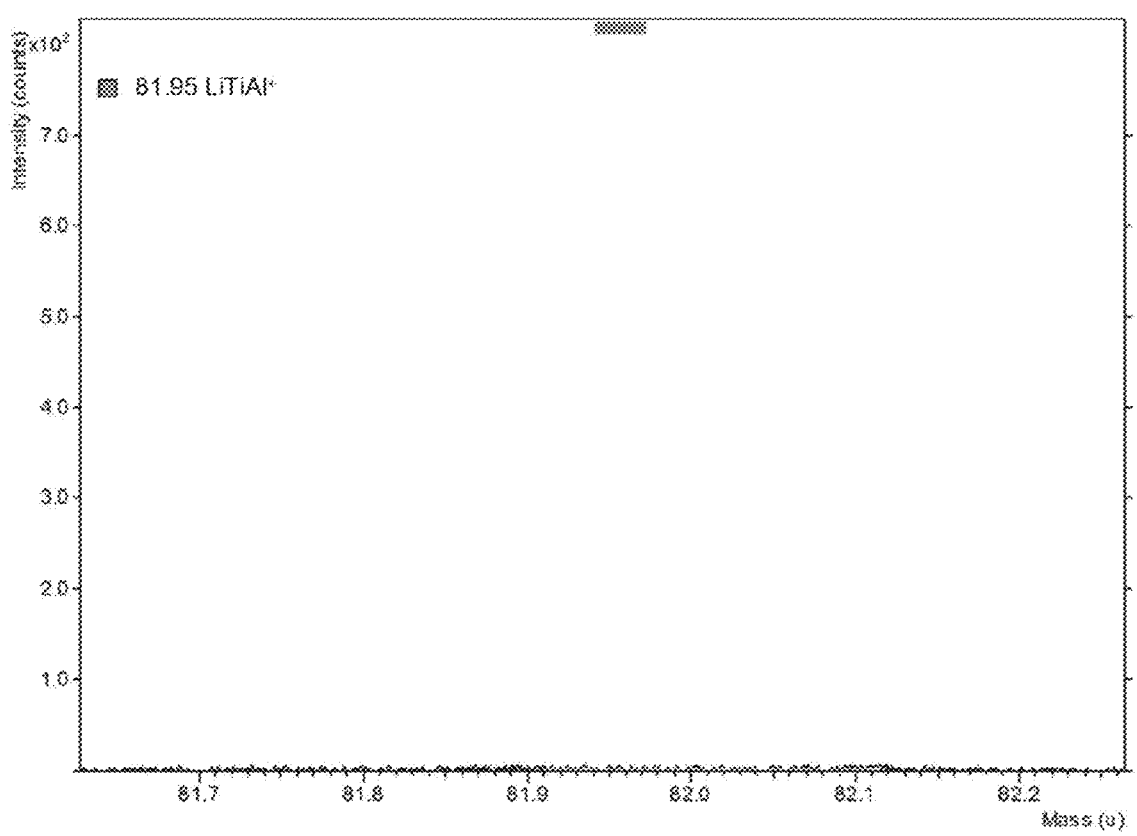
FIG. 5C is a graph illustrating analyzed results of contents of $LiTiAl^+$ compound in a region corresponding to the image of FIG. 5B

FIG. 5C is a graph illustrating analyzed results of contents of LiTiAl$^+$ compound in a region corresponding to the image of FIG. 5B The LiAlTi$^+$ compound may refer to a compound including lithium, aluminum, and titanium, and does not mean that a molar ratio of lithium, aluminum, and titanium is specified as 1:1:1.

Referring to FIGS. 2 to 5, it could be confirmed that, in a case of the comparative examples, a lithium-aluminum-titanium oxide was not substantially present on the surface of the cathode active material, but in a case of the examples, the lithium-aluminum-titanium oxide was present on the surface of the cathode active material.

SEM Image Analysis

Figure 6A:
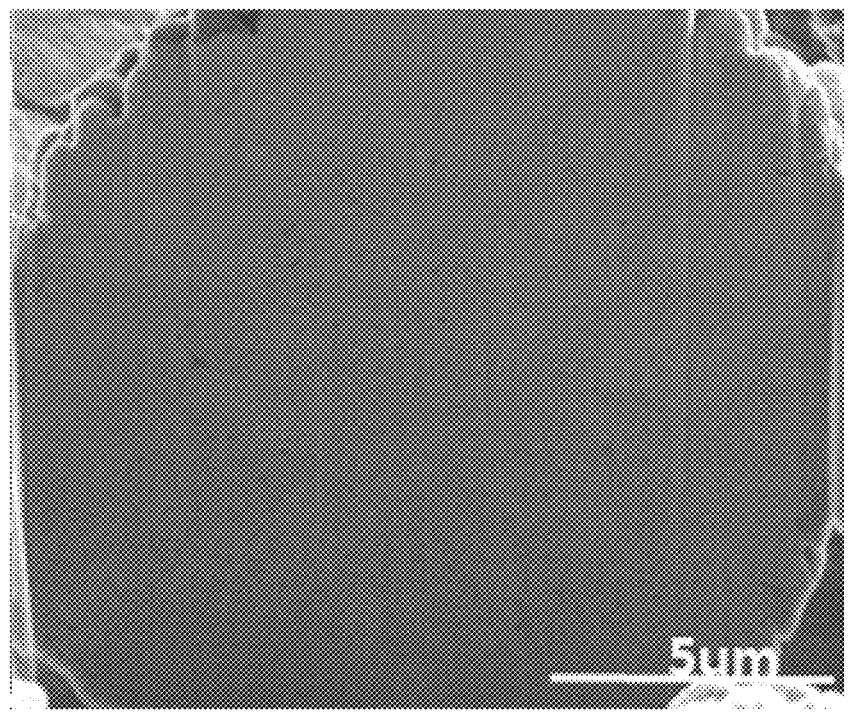
FIG. 6A is a scanning electron microscopy (SEM) image illustrating a cross-section of a cathode active material for a lithium secondary battery of Example 7.

FIG. 6A is a scanning electron microscopy (SEM) image illustrating a cross-section of a cathode active material for a lithium secondary battery of Example 7.

Figure 6B:
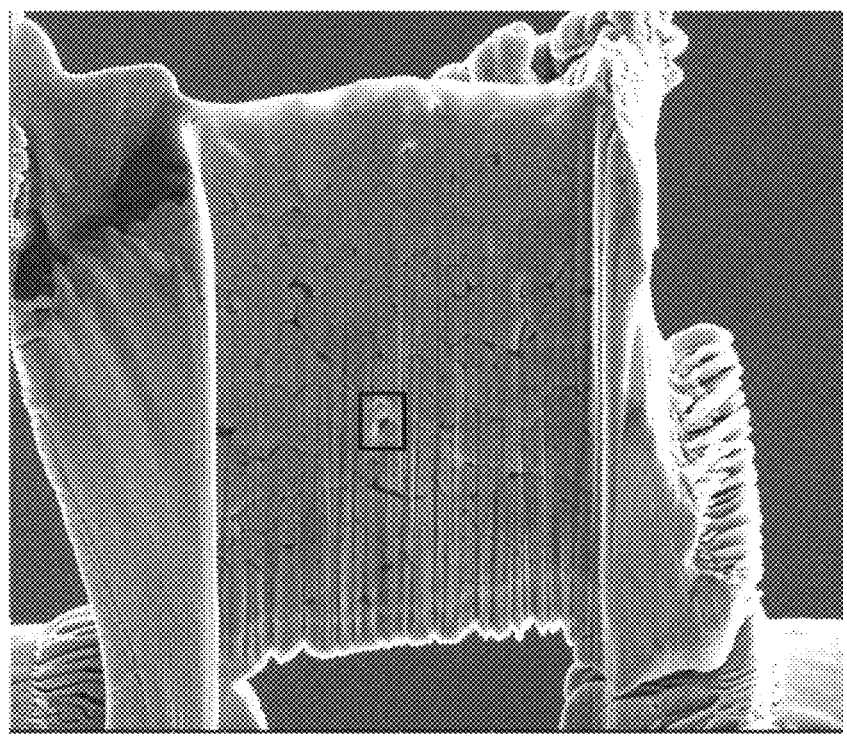
FIG. 6B is an SEM image illustrating a cross-section of a cathode active material for a lithium secondary battery of Example 7 after charging and discharging at a temperature of 60° C. for 350 cycles.

FIG. 6B is an SEM image illustrating a cross-section of a cathode active material for a lithium secondary battery of Example 7 after charging and discharging at a temperature of 60° C. for 350 cycles.

Figure 6C:
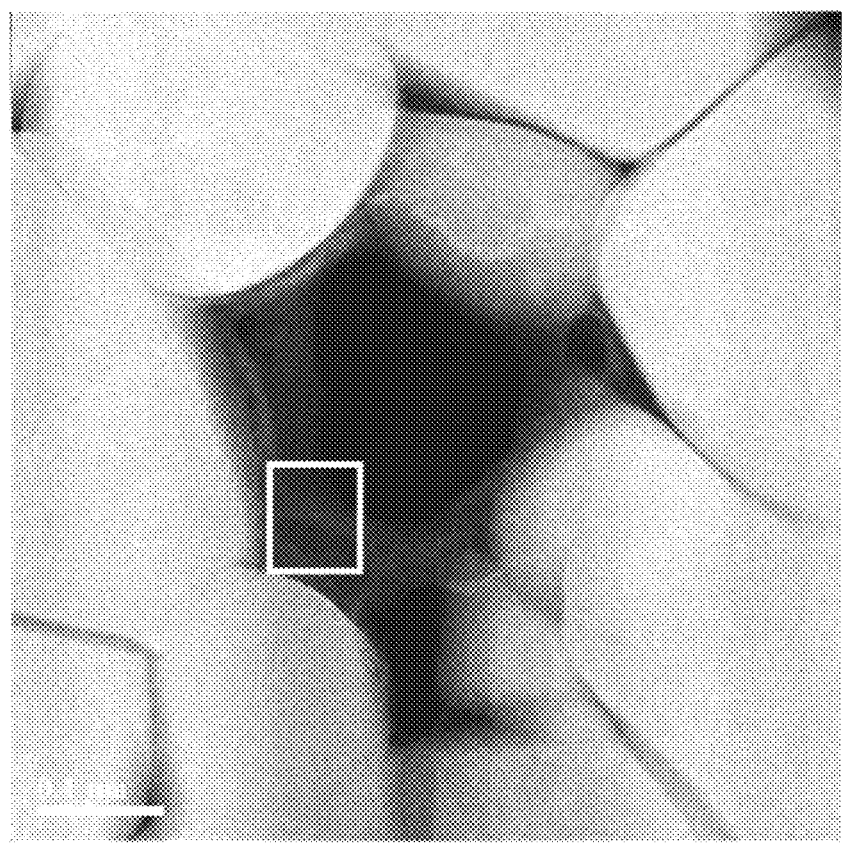
FIG. 6C is an enlarged SEM image illustrating a rectangular region in FIG. 6B.

FIG. 6C is an enlarged SEM image illustrating a rectangular region in FIG. 6B.

Figure 7A:
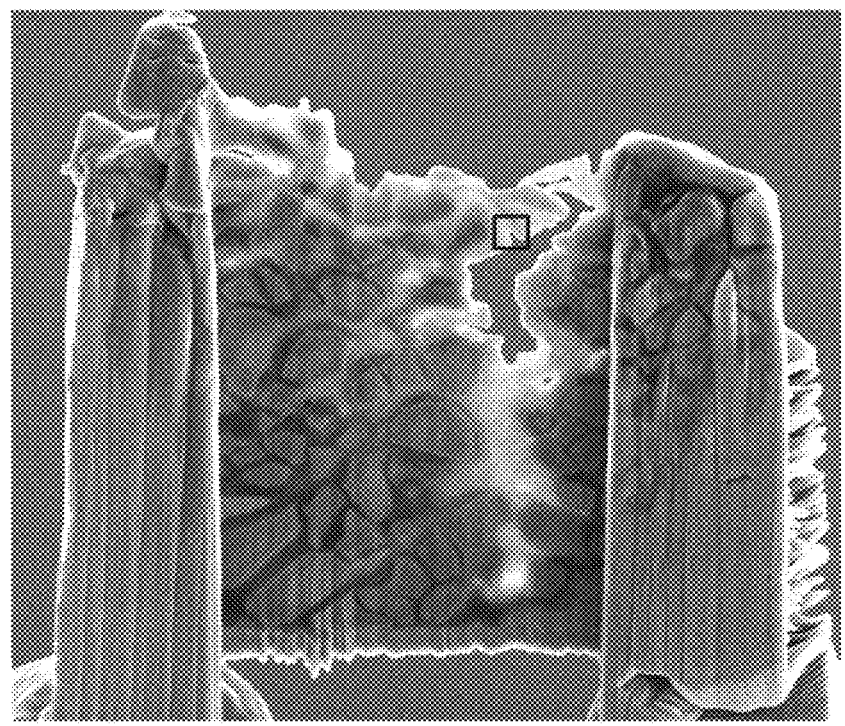
FIG. 7A is an SEM image illustrating a cross-section of a cathode active material of Comparative Example 1 after charging and discharging at a temperature of 60° C. for 350 cycles.

FIG. 7A is an SEM image illustrating a cross-section of a cathode active material of Comparative Example 1 after charging and discharging at a temperature of 60° C. for 350 cycles.

Figure 7B:
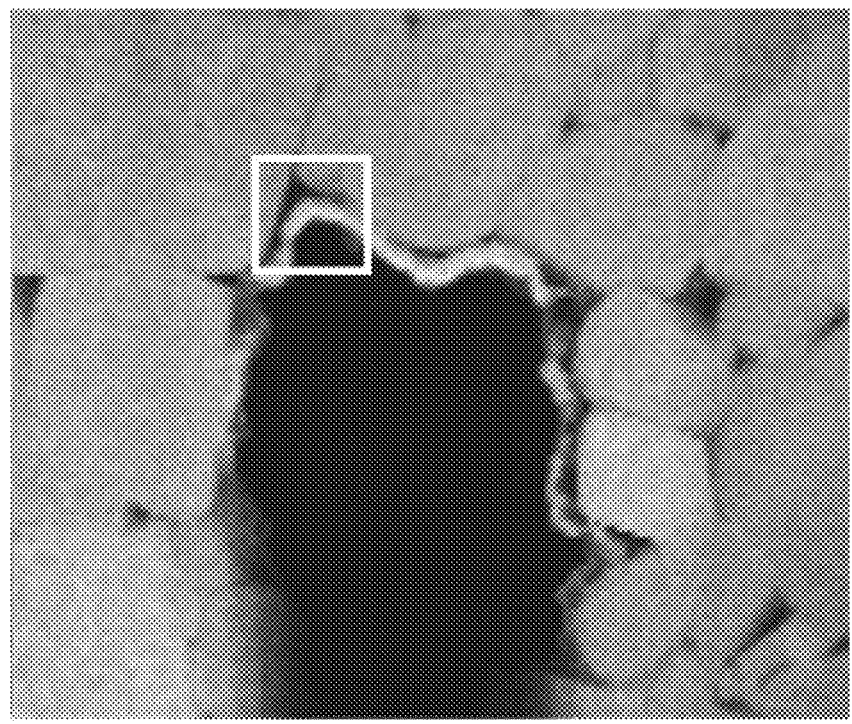
FIG. 7B is an enlarged SEM image illustrating a rectangular region in FIG. 7A.

FIG. 7B is an enlarged SEM image illustrating a rectangular region in FIG. 7A.

Figure 8A:
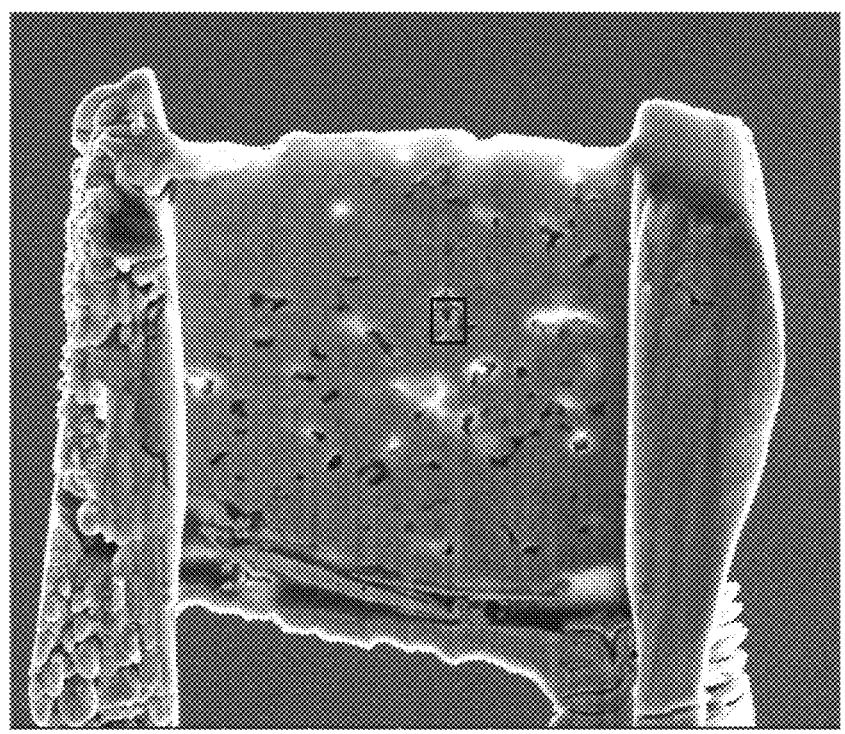
FIG. 8A is an SEM image illustrating a cross-section of a cathode active material of Comparative Example 36 after charging and discharging at a temperature of 60° C. for 350 cycles.

FIG. 8A is an SEM image illustrating a cross-section of a cathode active material of Comparative Example 36 after charging and discharging at a temperature of 60° C. for 350 cycles.

Figure 8B:
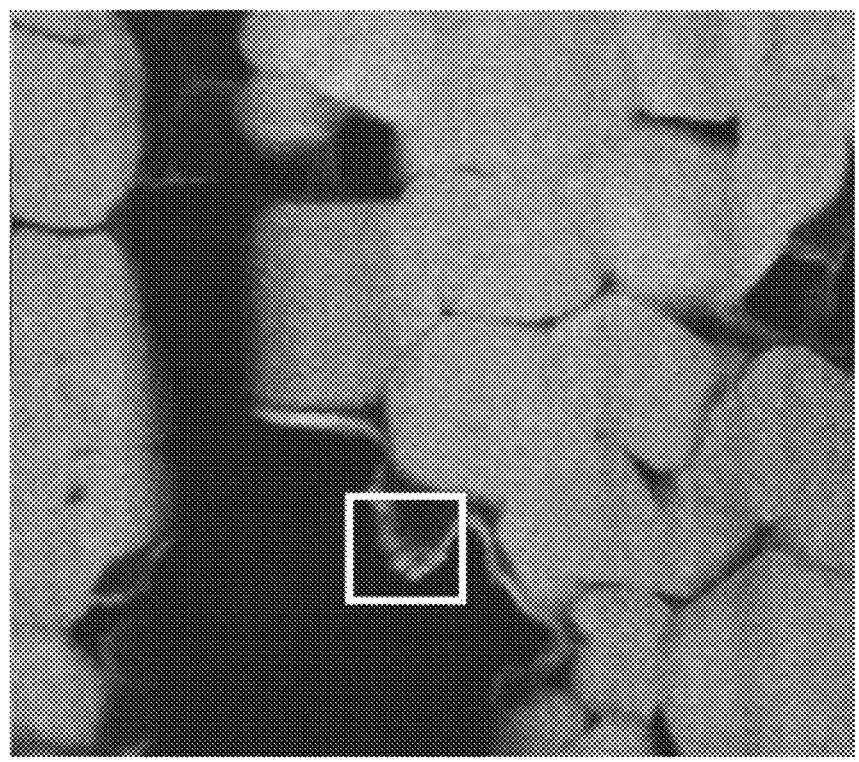
FIG. 8B is an enlarged SEM image illustrating a rectangular region in FIG. 8A.

FIG. 8B is an enlarged SEM image illustrating a rectangular region in FIG. 8A.

Referring to FIGS. 6 to 8, it could be seen that damages and deformations generated on the particle surfaces and internal structures of the cathode active materials prepared in the comparative examples were significantly larger than those of the cathode active material prepared in Example 7 before and after operating the battery at a high temperature. Therefore, it could be seen that the structure of the cathode active material particles might be effectively protected when forming the lithium-aluminum-titanium oxide coating layer.

TEM-EDS Analysis

The rectangular regions in FIGS. 6C, 7B and 8B were analyzed by using transmitting electron microscopy-energy dispersive spectroscopy (TEM-EDS), and the analyzed contents (mol %) of Ni, Co, Mn and F elements are shown in Table 2 below.

TABLE 2

| Section | Ni | Co | Mn | F |
|---|---|---|---|---|
| FIG. 6C (Example 7) | 89.0 | 7.1 | 2.1 | 1.8 |
| FIG. 7B (Comparative Example 1) | 82.8 | 2.5 | 2.7 | 12.0 |
| FIG. 8B (Comparative Example 36) | 87.5 | 5.3 | 2.0 | 5.2 |

Referring to FIGS. 6C, 7B and 8B and the above Table 2, it could be confirmed that a level in which precipitates (white bands in the drawings) are formed on the surfaces of the cathode active materials prepared in the examples after operating the battery at the high temperature was lower, and the content of F element of components in precipitates was significantly lower than that of the cathode active materials prepared in the comparative examples.

In general, when repeatedly operating the lithium secondary battery, the internal structure of the cathode active material may be destroyed. As the electrolyte penetrates into the destroyed structure to cause a side reaction, the metal component of the cathode active material is eluted, and the eluted component may form a fluoride salt with the F element. Therefore, the structural and chemical defects in the cathode active material are increased, such that the life-span and output of the secondary battery may be reduced.

However, in the case of the cathode active material prepared in the examples of the present invention, it could be confirmed that the formation of the fluoride salt was few and the structure is stable after repeatedly operating the battery under a high temperature condition.

(2) Measurement of Amount of Eluted Transition Metal-Inductively Coupled Plasma (ICP) Spectroscopic Analysis The electrode, the electrolyte, and the separation membrane, which had undergone the electrochemical evaluation, were put into 5 g of dimethyl carbonate (DMC) while charging and discharging 300 times at a temperature of 60° C., followed by stirring for about 10 minutes. Then, 0.5 g of liquid was taken through a filter and again diluted 200 times with respect to a mother liquor to prepare 100 ml of sample. The prepared sample was analyzed using a high temperature plasma.

(3) Measurement of 0.1 C Initial Capacity

Initial discharge capacities were measured by charging (CC/CV 0.1 C 4.3 V 0.05 CA CUT-OFF) and discharging (CC 0.1 C 3.0 V CUT-OFF) once with the battery cells according to the examples and the comparative examples (CC: constant current, CV: constant voltage).

(4) 4 C/0.1 C Capacity Retention Rate at Room Temperature

Discharge capacities, which were obtained by charging (CC/CV 0.1 C 4.3 V 0.05 CA CUT-OFF) and discharging (CC 0.1 C 3.0 V CUT-OFF) once, and initial discharge capacities, which were obtained by charging (CC/CV 0.5 C 4.3 V 0.05 CA CUT-OFF) and discharging (CC 4 C 3.0 V CUT-OFF) once with the battery cells according to the examples and the comparative examples, were measured.

The initial efficiency was measured by a percentage value obtained by dividing the 4 C discharge amount measured above by the 0.1 C discharge amount.

(5) Measurement of Capacity Retention Rate for 350 Cycles at High Temperature

Discharge capacities were measured by charging (CC/CV 0.5 C 4.3 V 0.05 CA CUT-OFF) and discharging (CC 1.0 C 3.0 V CUT-OFF) with the battery cells according to the examples and the comparative examples at a temperature of 60° C.

The cycle was repeated 350 times to evaluate the capacity retention rate as a percentage of the discharge capacity at 350 times divided by the discharge capacity at one time.

The evaluation results are shown in Table 3 below.

TABLE 3

| | lithium-aluminum-titanium oxide on lithium metal oxide | Amount of eluted transition metal (after 300 cycles at 60° C.) | | | Initial discharge capacity at room temperature (mAh/g) | 4 C/0.1 C capacity retention ratio at room temperature | Storage and discharge capacity retention ratio after 350 cycles at High temperature |
|---|---|---|---|---|---|---|---|
| | | Ni | Co | Mn | | | |
| Example 1 | ○ | 17836 | 1486 | 535 | 189 | 88% | 68% |
| Example 2 | ○ | — | — | — | 189 | 88% | 68% |
| Example 3 | ○ | 16562 | 1380 | 497 | 188 | 88% | 84% |
| Example 4 | ○ | 28024 | 1808 | 823 | 201 | 86% | 73% |
| Example 5 | ○ | 26047 | 2108 | 728 | 200 | 86% | 78% |
| Example 6 | ○ | 24037 | 1908 | 625 | 200 | 86% | 78% |
| Example 7 | ○ | 24094 | 2008 | 723 | 199 | 86% | 85% |
| Example 8 | ○ | 22086 | 1841 | 663 | 198 | 86% | 88% |
| Example 9 | ○ | 23291 | 1941 | 699 | 199 | 86% | 88% |
| Example 10 | ○ | 25299 | 2108 | 759 | 198 | 87% | 87% |
| Example 11 | ○ | 22889 | 1907 | 687 | 197 | 80% | 86% |
| Example 12 | ○ | — | — | — | 203 | 84% | 57% |
| Example 13 | ○ | — | — | — | 202 | 84% | 57% |
| Example 14 | ○ | — | — | — | 202 | 84% | 59% |
| Example 15 | ○ | 24866 | 2261 | 995 | 201 | 84% | 63% |
| Example 16 | ○ | — | — | — | 206 | 85% | 55% |
| Example 17 | ○ | 36168 | 3288 | 1447 | 205 | 85% | 58% |
| Example 18 | ○ | 31647 | 2877 | 1266 | 205 | 85% | 61% |
| Example 19 | ○ | 26222 | 2384 | 1049 | 204 | 85% | 67% |
| Example 20 | ○ | 46865 | 4687 | 2343 | 209 | 81% | 42% |
| Example 21 | ○ | 44702 | 4470 | 2235 | 209 | 81% | 47% |

TABLE 3-continued

| | lithium-aluminum-titanium oxide on lithium metal oxide | Amount of eluted transition metal (after 300 cycles at 60° C.) | | | Initial discharge capacity at room temperature (mAh/g) | 4 C/0.1 C capacity retention ratio at room temperature | Storage and discharge capacity retention ratio after 350 cycles at High temperature |
|---|---|---|---|---|---|---|---|
| | | Ni | Co | Mn | | | |
| Example 22 | ○ | 36050 | 3605 | 1803 | 208 | 81% | 55% |
| Example 23 | ○ | 22889 | 1907 | 687 | 197 | 80% | 86% |
| Comparative Example 1 | x | 40157 | 3346 | 1205 | 203 | 85% | 36% |
| Comparative Example 2 | x | 34133 | 2844 | 1024 | 203 | 85% | 36% |
| Comparative Example 3 | x | 35338 | 2945 | 1060 | 203 | 85% | 36% |
| Comparative Example 4 | x | 32929 | 2744 | 988 | 203 | 85% | 36% |
| Comparative Example 5 | x | 33732 | 2811 | 1012 | 203 | 85% | 36% |
| Comparative Example 6 | x | — | — | — | 203 | 85% | 36% |
| Comparative Example 7 | x | — | — | — | 203 | 85% | 36% |
| Comparative Example 8 | x | — | — | — | 203 | 85% | 36% |
| Comparative Example 9 | x | — | — | — | 203 | 85% | 36% |
| Comparative Example 10 | x | — | — | — | 203 | 85% | 36% |
| Comparative Example 11 | x | — | — | — | 203 | 85% | 36% |
| Comparative Example 12 | x | 45210 | 4110 | 1808 | 205 | 83% | 12% |
| Comparative Example 13 | x | — | — | — | 205 | 83% | 12% |
| Comparative Example 14 | x | — | — | — | 205 | 83% | 12% |
| Comparative Example 15 | x | — | — | — | 205 | 83% | 12% |
| Comparative Example 16 | x | — | — | — | 205 | 83% | 12% |
| Comparative Example 17 | x | — | — | — | 205 | 83% | 12% |
| Comparative Example 18 | x | 45210 | 4110 | 1808 | 208 | 84% | 0% |
| Comparative Example 19 | x | — | — | — | 208 | 84% | 18% |
| Comparative Example 20 | x | — | — | — | 208 | 84% | 18% |
| Comparative Example 21 | x | — | — | — | 208 | 84% | 18% |
| Comparative Example 22 | x | — | — | — | 208 | 84% | 18% |
| Comparative Example 23 | x | — | — | — | 208 | 84% | 18% |
| Comparative Example 24 | x | 32551 | 2959 | 1302 | 208 | 84% | 18% |
| Comparative Example 25 | x | — | — | — | 208 | 84% | 18% |
| Comparative Example 26 | x | 72100 | 7210 | 3605 | 212 | 80% | 0% |
| Comparative Example 27 | x | 50470 | 5047 | 2524 | 212 | 80% | 0% |
| Comparative Example 28 | x | 25480 | 2123 | 764 | 190 | 87% | 52% |
| Comparative Example 29 | x | — | — | — | 190 | 87% | 52% |
| Comparative Example 30 | x | 18543 | 1545 | 556 | 185 | 86% | 60% |
| Comparative Example 31 | x | 13351 | 1113 | 401 | 185 | 86% | 60% |
| Comparative Example 32 | x | 12980 | 1082 | 389 | 185 | 86% | 78% |

TABLE 3-continued

| | lithium-aluminum-titanium oxide on lithium metal oxide | Amount of eluted transition metal (after 300 cycles at 60° C.) | | | Initial discharge capacity at room temperature (mAh/g) | 4 C/0.1 C capacity retention ratio at room temperature | Storage and discharge capacity retention ratio after 350 cycles at High temperature |
|---|---|---|---|---|---|---|---|
| | | Ni | Co | Mn | | | |
| Comparative Example 33 | x | 12578 | 1081 | 634 | 160 | 87% | 80% |
| Comparative Example 34 | x | 10314 | 886 | 520 | 160 | 87% | 82% |
| Comparative Example 35 | x | 10062 | 865 | 507 | 160 | 87% | 84% |
| Comparative Example 36 | x | 30157 | 2513 | 905 | 200 | 80% | 46% |

Referring to the above Table 3, amounts of eluted transition metal in the secondary batteries of the examples after operating the battery at the high temperature were lower than those of the secondary batteries of the comparative examples in which the lithium-aluminum-titanium oxide was not formed, and from this result, it could be seen that the stability of the surface and internal structure of the cathode active material particles may be secured due to the lithium-aluminum-titanium oxide.

In addition, it could be confirmed that the life-span and high temperature characteristics of the battery are improved, for example, due to the structural stability of the cathode active material particles.

Further, it could also be confirmed that, when a zirconium and/or boron oxide is doped in the coating layer or a separate coating layer is formed using $ZrO_2$ and/or $H_3BO_3$, life-span maintenance characteristics at a high temperature were further improved.

Furthermore, it could also be confirmed that the battery cells of the examples, which include a molar ratio of 0.7 or more, had significantly higher capacity retention rate or larger initial discharge amount than those of the battery cells of the comparative examples, which include a molar ratio of 0.6 or 0.5.

What is claimed is:

1. A cathode active material for a lithium secondary battery, comprising:
    a lithium metal oxide particle formed of a crystal of a compound represented by Formula 1 below; and
    a lithium-aluminum-titanium oxide represented by Formula 2 below and formed on at least a part of a surface of the lithium metal oxide particle:

$$Li_\alpha Ni_y M_z O_{2-\beta}$$ [Formula 1]

wherein, in the above Formula 1, M is at least one element selected from the group consisting of Co, Mn, Ti, Zr, Al and B, and α, β, y, and z are in a range of $0.7 \leq \alpha \leq 1.1$, $-0.1 \leq \beta \leq 0.5$, $0.7 \leq y \leq 0.95$, and $0.95 < y+z \leq 1.1$, respectively $$Li_\gamma Al_v Ti_w O_x$$ [Formula 2]

wherein, in the above Formula 2, γ, v, w and x are in a range of $0.8 < \gamma \leq 1.2$, $0 < v \leq 1$, $0 < w \leq 1$, $0.98 \leq v+w \leq 1.02$, and $1.5 \leq x \leq 4$, respectively.

2. The cathode active material for a lithium secondary battery according to claim 1, wherein, in the above Formula 1, $M_z$ is $Co_a Mn_b M'_c$, M' is at least one element selected from the group consisting of Ti, Zr, Al and B, and a, b, c, and y are in a range of $0.05 \leq a \leq 0.2$, $0.03 \leq b \leq 0.2$, and $0.95 < y+a+b+c \leq 1.1$, respectively.

3. The cathode active material for a lithium secondary battery according to claim 2, wherein, in the above Formula 1, a, b, c, and y are in a range of $0.8 \leq y \leq 0.88$, $0.09 \leq a \leq 0.1$, $0.03 \leq b \leq 0.1$, respectively.

4. The cathode active material for a lithium secondary battery according to claim 1, further comprising at least one of $Al_2O_3$ and $LiAlO_2$ formed on the surface of the lithium metal oxide particle.

5. The cathode active material for a lithium secondary battery according to claim 1, further comprising $LiTiO_2$ formed on the surface of the lithium metal oxide particle.

6. The cathode active material for a lithium secondary battery according to claim 1, further comprising a zirconium (Zr)-including oxide formed on the surface of the lithium metal oxide particle.

7. The cathode active material for a lithium secondary battery according to claim 6, wherein the zirconium including oxide includes AlZrO.

8. The cathode active material for a lithium secondary battery according to claim 1, further comprising a boron (B)-including oxide formed on the surface of the lithium metal oxide particle.

9. The cathode active material for a lithium secondary battery according to claim 8, wherein the boron including oxide includes at least one selected from the group consisting of $B_4O_{10}$, $AlBO_3$ and $Li_2B_4O_7$.

10. The cathode active material for a lithium secondary battery according to claim 1, wherein the lithium-aluminum-titanium oxide is formed by dry-mixing the lithium metal oxide particle with $Al_2O_3$ and $TiO_2$ having a particle diameter of 30 to 70 nm, respectively, under a high temperature condition, then performing oxygenation.

11. The cathode active material for a lithium secondary battery according to claim 10, wherein the dry-mixing is performed by further including at least one of $ZrO_2$ and $H_3BO_3$.

12. The cathode active material for a lithium secondary battery according to claim 11, wherein $Al_2O_3$, $TiO_2$, $ZrO_2$ and $H_3BO_3$ are used in an amount of 2500 to 3500 ppm, 500 to 1500 ppm, 300 to 700 ppm, and 300 to 700 ppm, respectively, based on a weight of the lithium metal oxide particle.

13. The cathode active material for a lithium secondary battery according to claim 11, wherein the $ZrO_2$ has a particle diameter of 70 to 130 nm.

14. The cathode active material for a lithium secondary battery according to claim 11, wherein the lithium-aluminum-titanium oxide is formed by dry-mixing the lithium metal oxide particle with $Al_2O_3$, $TiO_2$ and $ZrO_2$ under a high temperature condition and performing oxygenation, then further dry-mixing $H_3BO_3$ therewith under a high temperature condition and performing oxygenation.

15. The cathode active material for a lithium secondary battery according to claim 14, wherein the $Al_2O_3$, $TiO_2$ and $ZrO_2$ are mixed at a temperature of 600 to 800° C. and the $H_3BO_3$ is mixed at a temperature of 250 to 330° C.

16. The cathode active material for a lithium secondary battery according to claim 1, wherein the lithium metal oxide particle and the lithium-aluminum-titanium oxide are formed by dry-mixing a composite metal salt compound, a lithium salt compound, and $Al_2O_3$ and $TiO_2$ having a particle diameter of 30 to 70 nm, respectively, under a high temperature condition and performing oxygenation.

17. The cathode active material for a lithium secondary battery according to claim 1, wherein at least a part of the surface of the lithium metal oxide particle is coated with the lithium-aluminum-titanium oxide.

18. A lithium secondary battery comprising:
an electrode assembly including a cathode made of the cathode active material for a lithium secondary battery according to claim 1, an anode, and a separation membrane disposed between the cathode and the anode;
a case in which the electrode assembly is housed; and
an electrolyte in which the electrode assembly is impregnated in the case.

* * * * *